United States Patent
Volta et al.

(10) Patent No.: US 11,270,437 B1
(45) Date of Patent: Mar. 8, 2022

(54) TOP-DOWN SEGMENTATION PIXEL ORIENTATION AND DISTANCE

(71) Applicant: Zoox, Inc., Foster City, CA (US)

(72) Inventors: Stanley L. Volta, Foster, CA (US); Allan Zelener, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 17/127,295

(22) Filed: Dec. 18, 2020

(51) Int. Cl.
*G06K 9/00* (2006.01)
*G06T 15/08* (2011.01)
*G06T 7/10* (2017.01)

(52) U.S. Cl.
CPC ............ *G06T 7/10* (2017.01); *G06K 9/00791* (2013.01); *G06T 15/08* (2013.01); *G06T 2207/20081* (2013.01); *G06T 2207/30252* (2013.01); *G06T 2210/12* (2013.01)

(58) Field of Classification Search
None
See application file for complete search history.

(56) References Cited

U.S. PATENT DOCUMENTS

| | | | |
|---|---|---|---|
| 2019/0025858 A1* | 1/2019 | Bar-Nahum | B64D 47/08 |
| 2020/0160070 A1* | 5/2020 | Sholingar | G06N 3/084 |

* cited by examiner

*Primary Examiner* — Idowu O Osifade
(74) *Attorney, Agent, or Firm* — Lee & Hayes, P.C.

(57) ABSTRACT

Techniques for segmenting sensor data are discussed herein. Data can be represented in individual levels in a multi-resolution voxel space. A first level can correspond to a first region of an environment and a second level can correspond to a second region of an environment that is a subset of the first region. In some examples, the levels can comprise a same number of voxels, such that the first level covers a large, low-resolution region, while the second level covers a smaller, higher-resolution region, though more levels are contemplated. Operations may include analyzing sensor data represented in the voxel space from a perspective, such as a top-down perspective. From this perspective, techniques may generate masks that represent objects in the voxel space. Additionally, techniques may generate segmentation data to verify and/or generate the masks, or otherwise cluster the sensor data.

20 Claims, 8 Drawing Sheets

TOP-DOWN SEGMENTATION PIXEL ORIENTATION AND DISTANCE

BACKGROUND

Autonomous vehicles may use sensors to capture data representing objects in an environment. In some cases, sensor data may be associated with a voxel space for subsequent processing, and segmentation techniques may be used for associating sensor data with objects. Segmentation of three-dimensional data, however, presents particular challenges that may result in inaccurate object detection, segmentation, and/or poor responsiveness of object detection and segmentation. Additionally, in some cases, increasing a size of a voxel space and/or number of voxels rapidly increases an amount of memory and/or processing on such data, which may present challenges in resource-constrained environments.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
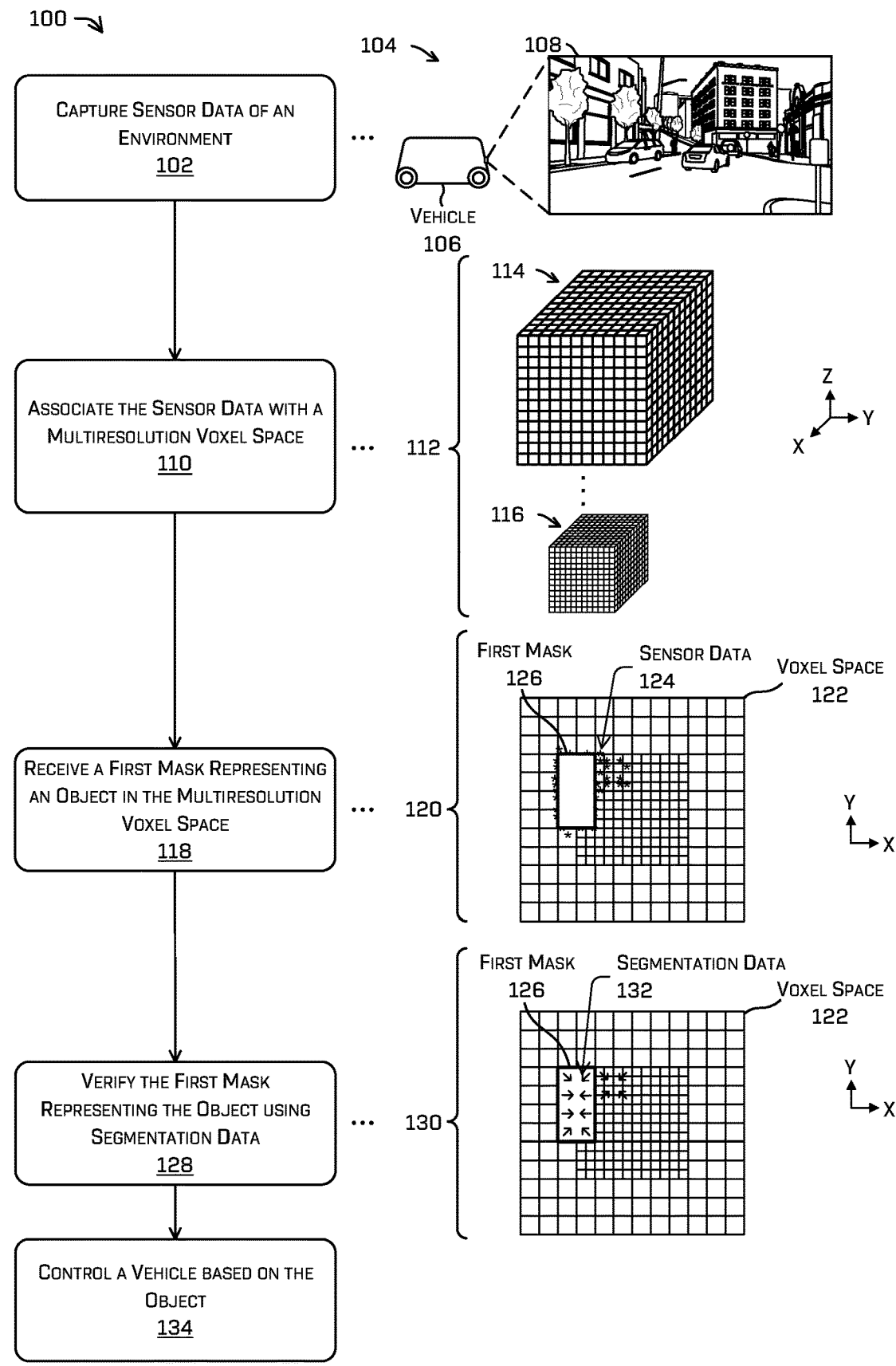
FIG. 1 is a pictorial flow diagram of an example process of capturing sensor data, associating the sensor data with a multi-resolution voxel space, and subsequent top-down segmentation.

Techniques for segmenting sensor data are discussed herein. For example, techniques may include segmenting three-dimensional data represented in a multi-resolution volume element ("voxel") space to determine objects in an environment. In some instances, an autonomous vehicle may include a plurality of sensors to capture sensor data corresponding to an environment of the vehicle. The sensor data may include data associated with an environment where, in some examples, multiple objects (e.g., pedestrians, vehicles, bicyclists, etc.) are located adjacent or in close proximity to one another. Additionally, a multi-resolution voxel space may include a plurality of voxel spaces, whereby data may be represented in one or more of the plurality of voxel spaces. The techniques described herein may include, but are not limited to, capturing the sensor data, associating the sensor data with a voxel space, such as, for example, a multi-resolution voxel space, viewing the sensor data from a "top-down view," and using a machine-learning algorithm to output masks associated with the one or more objects. Additionally, or alternatively, the techniques may include using a machine-learning algorithm to output image data comprising a pixel and segmentation data associated with the pixel. The segmentation data may indicate an orientation classification, an object classification, a distractor classification, and the like associated with the one or more objects. Such techniques may utilize the segmentation data to generate and/or verify the accuracy of the masks. The voxels within the masks may be associated with one or more object identifiers and the sensor data associated with the masks may be clustered. The clustered data may be passed to other classifiers to classify the one or more objects and/or to a planning system to determine a trajectory of the vehicle.

As discussed herein, sensor data may be captured by one or more sensors and may be represented in a multi-resolution voxel space. The multi-resolution voxel space may include representing the sensor data in a plurality of voxel spaces. For example, a first voxel space of a multi-resolution voxel space may correspond to a first region of an environment, whereby a voxel of the first voxel space may represent a first volume in the environment. A second voxel space of the multi-resolution voxel space may correspond to a second region of an environment, whereby a voxel of the second voxel space may represent a second volume in the environment. In some examples, the first voxel space and the second voxel space may at least partially overlap, or otherwise correspond to a same portion of space in an environment. In some examples, the first voxel space and the second voxel space may comprise a same number of voxels, such that the first level covers a smaller, high resolution area, while the second level covers a larger, lower resolution area. As data is captured representing an environment, the data may be associated with a voxel of the first level and/or a voxel of the second level of the voxel space. Data represented in the voxel space may be processed at higher resolution where available (e.g., near an origin associated with a sensor) and at a lower resolution where a data density is lower (e.g., further away from the origin associated with a sensor).

As noted above, sensor data may be represented in a three-dimensional voxel space. Feature data may be determined for a region of the three-dimensional space, such as a column of voxels. For example, feature data may include (for sensor data associated with a column), but is not limited to, an average x-value coordinate, an average y-value coordinate, an average z-value coordinate, an average sensor intensity, an average probability that the sensor data represents one or more classes of objects, an indication of previous occupancy, ray casting information, and the like. In some examples, one or more features associated with the three-dimensional voxel space may be encoded or otherwise stored as a layer of a multi-channel input image. Thus, the data may be efficiently represented for input to the machine learned model.

For example, the machine learned model may accept voxel data in the form of a top-down multi-channel input image. Particularly, the model accepts voxel data in the form of an image of size equal to the number of X and Y discretizations of the grid, the image having a number of layers equal to the number of discretizations in the Z dimension, where the Z dimension is indicative of a height dimension.

Additionally, or alternatively, the Z dimension may be configured with voxels having a fixed voxel height. In some examples, features for each of these channels, equal to the number of layers of voxels in the Z dimension having the fixed height, may be computed, and all of the features in these channels may be represented as a multi-channel input image for input to the machine learned model.

In some examples, the multi-channel image data may include one or more layer(s) of image data. For example, the multi-channel image data can include a first two-dimensional layer (e.g., first channel) associated with first feature data and a second two-dimensional layer (e.g., second channel) associated with second feature data. Additionally, or alternatively, the multi-dimensional image data can include a group of two-dimensional layers, such as the first channel and the second channel associated with feature data representing a single feature. For example, the layer(s) of image data can include a layer of image data associated with a maximum height associated with each of the voxels of the voxel space, a layer of image data associated with a minimum height associated with each of the voxels, a layer of image data associated with an average height associated with each of the voxels, a layer of image data associated with a covariance associated with each of the voxels, a layer of image data associated with a surface normal associated with each of the voxels, and/or a layer of image data associated with a classification probability associated with each of the voxels.

In some examples, the multi-dimensional image data can comprise layers associated with multiple classes of semantic information, although in some examples, data associated with certain classifications can be omitted from the multi-channel image data.

In some examples, a variety of sensor data may be associated with the voxel space. For example, in some examples, the voxel space may represent lidar data, radar data, time-of-flight data, or any other depth data.

In some examples, the techniques discussed herein may be implemented in the context of a vehicle, such as an autonomous vehicle. The autonomous vehicle may capture sensor data as the vehicle traverses an environment and may associate the sensor data with the multi-resolution voxel space. A computing device associated with the autonomous vehicle may process data represented in the voxel space to perform various operations such as an alignment operation, a clustering operation, a segmentation operation, and the like.

A multi-resolution voxel space may comprise any number of levels. By way of example, and without limitation, a first level may represent a volume of 50 m×50 m×25 m, where an individual voxel of the first level is 0.5 m×0.5 m×0.25 m. By way of example, and without limitation, a second level may represent a volume of 100 meters (m)×100 m×50 m (length×width×height), where an individual voxel of the second level is 1 m×1 m×0.5 m. Of course, the multi-resolution voxel space may include any number of levels associated with any number or sizes of voxels.

In some examples, a number of voxels in each level may be the same as other levels, though, in other examples, the number of voxels may differ.

In some examples, the multi-resolution voxel space may be thought of as nested voxel spaces (e.g., similar to Russian nesting dolls), whereby voxels of a first voxel space share spatial locations with voxels of a second voxel space. In some examples, voxels of the first voxel space can be different in size to voxels of the second voxel space. In at least some examples, the dimensions of one voxel space may be related to the next, higher resolution, voxel space. As non-limiting examples of such, a subsequent voxel space may have two, four, or any even integer number of voxels along any dimension, though any other number (whether natural, rational, or irrational) is contemplated.

As noted above, techniques may include performing operations based on data associated with the multi-resolution voxel space. With the sensor data represented in the multi-resolution voxel space, operations may include using a machine learning algorithm to output a mask associated with an object in the environment. Additionally, or alternatively, operations may include using a machine learning algorithm to output image data including segmentation information associated with a pixel. In some examples, the mask and/or image data may be represented in a plan view or top-down view. In other instances, the mask and/or image data may be represented in an elevation view or a side view. As mentioned above, the segmentation information may indicate an orientation classification including data, such as, for example, direction information and distance information associated with an object that may be utilized to verify the accuracy of a mask and/or to further cluster the sensor data to segment objects.

By outputting image data including segmentation information associated with the pixels of the image data, the system may verify and/or regenerate the segmentation mask associated with the object in the environment. In some examples, the direction information and distance information associated with a pixel may provide an indication of the direction toward the center of the object from the pixel and/or how far away the pixel is from the center of the object.

In some examples, the direction information may be based on a class associated with the object and may provide direction information corresponding to the class. In some examples, the direction information may provide more specific direction information for a particular object class than others. For example, an object may be associated with a pedestrian class or the like, and a pixel of the object may include direction information, indicating a direction of four possible directions (e.g., two-dimensional quadrants) from the pixel to the center of the object. Additionally, or alternatively, an object may be associated with a car class, a bicycle class, or the like, and a pixel of the object may include direction information, indicating a direction of eight possible directions (e.g., represented as a two-dimensional octant) to the center of the object.

In some examples, the distance information may indicate a distance that the pixel is from a center of the object and may be determined with respect to other pixels associated with the object. For example, a first pixel located near an outer edge of an object may include distance information indicating that the first pixel is far from the center of the object. Additionally, or alternatively, a second pixel located near a center of an object may include distance information indicating that the second pixel is near the center of the object.

The direction information and distance information may be leveraged to verify the masks and/or draw a boundary line between two objects that are close together (or touching) in the environment. For example, an environment may include a first object and a second object proximal to the first object. In some examples, the machine learning algorithm may output a first mask associated with the first object and a second mask associated with the second object. The machine learning algorithm may also output image data including segmentation information associated with the pixels associated with the first object and the second object. The segmentation information may be used to delineate the first mask of the first object from the second mask of the second object. Additionally, or alternatively, the segmentation information may be used to generate the first and second mask in some examples where the machine learning algorithm may have generated a single mask for two separate objects that are very close in the environment. For example, the segmentation information may indicate, for a first pixel, a first direction from the first pixel toward the center of the object. The segmentation information may further indicate, for a second pixel neighboring the first pixel, a second direction from the second pixel to the center of the object, where the second direction may be opposite, or substantially differing, from the first direction, indicating that the pixels belong to separate objects. Additionally, or alternatively, the segmentation information may indicate, for the first pixel, a near distance from the pixel to the center of the object, and for the second pixel, a far distance from the pixel to the center of the object, which may further indicate that the pixels belong to separate objects.

To align the plurality of voxel spaces in a multi-resolution voxel space for efficient and/or accurate processing by one or more machine learning algorithms, the system may transform the data in various ways.

For example, the multi-resolution voxel space may include a first voxel space comprising a first range and a second voxel space comprising a second range, where the first range is less than the second range. By way of example and not limitation, the first range may extend 50 meters and the second range may extend 100 meters. Short-range image data representing a top-down view of the first voxel space and long-range image data representing a top-down view of the second voxel space may be determined. By way of example, and not limitation, the short-range image data may comprise an 800-pixel by 800-pixel (800×800) high-resolution image (e.g., comprised of fine pixel(s)) representing the first 50-meter range, and the long-range image data may comprise an 800×800 low-resolution image (e.g., comprised of coarse pixels, such as, for example, a pixel representing an area twice as coarse as a fine pixel) representing the second 100-meter range.

Aligning the high-resolution image with the low-resolution image as is for training and/or inferencing may lead to inconsistent and/or unpredictable results. As such, the short-range image data comprising the high-resolution image may be input into an encoder to downsample the high-resolution image, by a factor of two, for example, and determine downsampled short-range image data. The downsampled short-range image data may comprise 400-pixel by 400-pixel (400×400) low-resolution image representing the first 50-meter range. With the short-range image data and the long-range image data comprising low-resolution images, the images may be properly aligned to represent the top-down view of the multi-resolution voxel space, such as, for example, overlaying the short-range image data on the long-range image data and aligning a center of the short-range image data with a center of the long-range image data.

The encoder may encode the pixels such that, the data included in high-resolution pixels corresponding to a low-resolution pixel may be preserved by decoding the corresponding low-resolution pixel with a corresponding decoder.

Additionally, or alternatively, the downsampled image data may be further transformed to further improve and/or reduce the change of error associated with the alignment of the images. For example, the downsampled short-range image data may be input into a padding component, configured to pad, or otherwise fill in, the downsampled short-range image data from the first range (50-meters) out to the second range to align the rows and columns of the downsampled short-range image data with the rows and columns of the long-range image data. Padding the downsampled short-range image data may result in an 800×800 low-resolution image, such that, an inner 400×400 portion of the image data may represent the first 50-meter range, and the outer portion or the image data may include empty, or otherwise ignored data. This padding of the downsampled image data eliminates any margin for error when aligning the images, as both are represented as an 800×800 low-resolution image, and the padded portion of the downsampled short-range image data may be empty or otherwise ignored by the system, in favor of the long-range image data corresponding to the padded portion, during training and/or inferencing.

The techniques discussed herein may improve a functioning of a computing device, such as a computing device of an autonomous vehicle, in a number of ways. For example, using multiple levels in the multi-resolution voxel space facilitates high resolution management of data near a vehicle and lower resolution management of data further away from a vehicle. Such levels may significantly reduce an amount of memory for storing sensor data, for example, when compared to a voxel space associated with a single, high resolution level. In some examples, complex multi-dimensional data, such as lidar data or other depth data, may be represented in a multi-resolution voxel space, which may partition the data, allowing for efficient evaluation and processing of the data. The techniques described herein may also maintain and/or increase the accuracy of determining and detecting objects in an environment at an increased range. As may be understood, maintaining and/or increasing the accuracy of determining and detecting objects at an increased range may improve safety outcomes, particularly in the context of vehicles and autonomous vehicles. The techniques described herein may also improve safety outcomes by reducing the processing time of determining and detecting objects, and also determining and detecting objects at a further range. As may be understood, in the context of vehicles and autonomous vehicles, situations may arise where determination and detection of objects must occur quickly and accurately. Additionally, situations may arise where determination and detection of objects at a greater range must also occur quickly and accurately. As a non-limiting example, other methods which undersegment and/or oversegment objects in an environment may cause errors in subsequent systems (e.g., classification systems, planning systems, etc.) which rely on such data for safe vehicle operation. Thus, the techniques described herein may improve a functioning of a computing device as well as improve safety outcomes.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In one example, similar techniques may be utilized in driver-controlled vehicles in which such a system may provide an indication of whether it is safe to perform various maneuvers. In another example, the techniques may be utilized in a manufacturing assembly line context, in an aerial surveying context, or in a nautical context. Additionally, the techniques described herein may be used with real data (e.g., captured using sensor(s)), simulated data (e.g., generated by a simulator), or any combination of the two.

FIG. 1 is a pictorial flow diagram of an example process 100 of capturing sensor data, associating the sensor data with a multi-resolution voxel space, and subsequent top-down segmentation.

At operation 102, the process may include capturing sensor data of an environment. An example 104 illustrates a vehicle 106 capturing sensor data 108 of an environment. In some examples, the sensor data 108 may comprise lidar data, radar data, sonar data, time-of-flight data, or other depth data. For example, the operation 102 may include capturing image data and generating depth data based on the captured image data.

At operation 110, the process may include associating the sensor data and semantic data with a multi-resolution voxel space. A multi-resolution voxel space is illustrated as an example voxel space 112. By way of example, and without limitation, the example voxel space 112 may comprise a first level 114 and a second level 116.

The first level 114 is illustrated as a voxel space comprising twelve voxels in each dimension (e.g., x, y, z), although any number of voxels may be included in the voxel space. In some examples, the first level 114 may correspond to a physical environment, such as an area around an origin or a virtual origin of the sensor data.

The second level 116 is illustrated as a voxel space comprising twelve voxels in each dimension (e.g., x, y, z), although any number of voxels may be included in the voxel space. In some examples, the second level 116 may correspond to a physical environment, such as an area around an origin or a virtual origin of the sensor data.

In some examples, if a side length represented by the first level 114 is x, a side length represented by the second level 116 may be x/2. That is, the example voxel space 112 may include levels starting with a root-level resolution (e.g., a lowest resolution), and every new (finer resolution) level starts at half extents of the previous level. In some examples, each new level may represent third, fourth, or fifth extents, although any levels of resolution may be used for the various levels, as discussed herein.

Although two levels 114 and 116 are discussed in FIG. 1, it may be understood that the example voxel space 112 may include any number of voxels and/or levels, and the examples shown are but one possible implementation.

In some examples, an origin of each of the first level 114 and the second level 116 may be associated with a same location (e.g., a center of the vehicle 106, an origin or a virtual origin associated with a sensor capturing the sensor data 108, and the like).

In some examples, as data is captured over time, the operation 110 may include aligning a meta spin (e.g., a sensor dataset associated with data from a plurality of sensors) with the voxel space. For example, the operation 110 may include determining a transformation to apply to the meta spin to align the meta spin to the voxel space. In particular, the operation 110 may include matching captured sensor data with data accumulated in the voxel space by determining the distance of observed points to a plane fitted to the existing accumulation of data, using iterative closest point techniques, and the like. In some examples, this transformation may reduce an error between a position of a vehicle with respect to a location on a global map.

In one example, the voxel space may be initialized as empty space and sensor data may be added to the voxel space as it is captured, and another example, the voxel space may be initialized with data representing a global map of previously captured data. In the case of using global map data, the operations may include comparing the locally captured sensor data against the global data to localize the autonomous vehicle in the global map space.

In some examples, the operation 110 may include mapping individual points of the sensor data (e.g., which may include a point cloud) to individual voxels.

In some examples, voxels within the voxel space may be instantiated when data is to be associated with such a voxel, thereby reducing or minimizing an amount of memory associated with a voxel space. In at least some examples, this may be performed using (as a non-limiting example), techniques such as voxel hashing. In some examples, some or all voxels of a voxel space may be preinitialized and, the operation 110 may include discarding or omitting voxels that do not include data, or that include a number of points below a threshold number, in order to create a sparse voxel space. Further, in some examples, the operation 110 may include aligning a pose of the vehicle 106 (e.g., an orientation of the vehicle 106) and associated sensor data with the voxel space, for example, to compensate or adjust for any error associated with a position of the vehicle with respect to the voxel space.

As noted above, the operation 110 may include associating semantic information with the voxel space. For example, the sensor data can be associated with one or more semantic classification(s) (e.g., label(s)). A label can be applied to a voxel or a sensor point in a column in the voxel space. The label can be associated with a type (e.g., walkable, drivable, etc.) of a surface and/or object. For example, the label can be associated with a walkable surface, a drivable surface, an object, etc.

Further, in some examples, the operation 110 may include statistically accumulating sensor data and processing the data as it is added to individual voxels. For example, individual voxels may include data representing a number of data points, an average intensity, an average x-value of the data, an average y-value of the data, an average z-value of the data, and/or a covariance matrix based on the sensor data associated with the individual voxel. Thus, in some examples, data associated with individual voxels may represent processed data, in part, to improve processing performance of the system.

Further, in some examples, the operation 110 may include determining multi-channel image data (e.g., a two-dimensional input grid) based on the multi-resolution voxel space. Each region or portion of the multi-channel image data may be determined as a region of a two-dimensional representation associated with a column (or other dimension) of the multi-resolution voxel space. In some examples, each region of the multi-channel image data may be a cell of the two-dimensional representation associated with the column of the multi-resolution voxel space. Each region of the two-dimensional input grid may be associated with a 50 centimeter×50 centimeter region and may include feature data. Each region may be associated with (e.g., positioned adjacent to) one or more adjacent (e.g., neighbor) regions.

An example of multi-channel image data (e.g., first multi-channel image data) is illustrated in an example 120. The first multi-channel image data may include a plurality of regions. Each of the regions may be determined as the region of the two-dimensional representation and may be associated with a column of the multi-resolution voxel space. For example, a region may be associated with a column, based on three-dimensional information associated with the column being converted to two-dimensional information associated with the region.

Each of the regions may include feature data. By way of example and without limitation, the feature data can include a maximum height, a minimum height, an average height, a covariance (e.g., covariance matrix), a surface normal, and/or a classification associated with the voxel.

The operation 110 may include inputting the top-down multi-channel image into a machine learned model trained to output mask(s) and/or segmentation information comprising distance information and/or direction information. Additionally, or alternatively, the multi-channel image data can be associated (e.g., combined/integrated) with a vehicle classification probability and/or a pedestrian classification probability.

The vehicle classification probability can indicate a probability of individual data points or regions of the first multi-channel image data being associated with at least a portion (e.g., door, roof, etc.) of a vehicle. The pedestrian classification probability can indicate a probability of individual data points or regions of the first multi-channel image data being associated with at least a portion (e.g., leg, torso, head, etc.) of a pedestrian.

As previously mentioned, the machine learned model may accept voxel data in the form of a top-down multi-channel input image. Particularly, the model accepts voxel data in the form of an image of size equal to the number of X and Y discretizations of the grid, the image having a number of channels equal to the number of discretizations in the Z dimension, where the Z dimension is indicative of a height dimension, as well as any other number of channels (such as additional features) as described herein.

Additionally, or alternatively, the Z dimension may be configured with voxels having a fixed voxel height. In some examples, features for each of these channels, equal to the number of layers of voxels in the Z dimension having the fixed height, may be computed, and all of the features in these channels may be represented as a multi-channel input image for input to the machine learned model.

In some examples, the multi-channel image data may include one or more layer(s) of image data. For example, the multi-channel image data can include a first two-dimensional layer (e.g., first channel) associated with first feature data and a second two-dimensional layer (e.g., second channel) associated with second feature data. For example, the layer(s) of image data can include a layer of image data associated with a maximum height associated with each of the voxels of the voxel space, a layer of image data associated with a minimum height associated with each of the voxels, a layer of image data associated with an average height associated with each of the voxels, a layer of image data associated with a covariance associated with each of the voxels, a layer of image data associated with a surface normal associated with each of the voxels, a layer of image data associated with an average sensor intensity, a layer of image data indicating previous occupancy (i.e., whether there is any data in the voxel or not), a layer of image data indicating ray casting information (e.g., indicating whether a ray from a LIDAR has passed through a voxel), and/or a layer of image data associated with a classification probability associated with each of the voxels.

In some examples, the multi-dimensional image data can comprise layers associated with multiple classes of semantic information, although in some examples, data associated with certain classifications can be omitted from the multi-channel image data.

In the context of this application, "top-down" refers to a representation of the voxel data as a multi-channel image from a "top-down" view. Other views, such as a side view, bottom-up, or any arbitrary view can be used. The multi-channel image can comprise "pixels" that correspond to locations of objects in an environment as well as other features of the object(s) or the sensor data in the voxel space. Additional aspects of the top-down (or any view) multi-channel image and the machine learned model are discussed throughout this disclosure.

At operation 118, the process may include receiving a mask representing an object in the multi-resolution voxel space. In some examples, a machine learning algorithm may be trained to output at least one mask associated with a multi-resolution voxel space. Additionally, in some examples, the machine learning algorithm may use sensor data to output the mask. In other instances, the machine learning algorithm may use sensor data and/or processed sensor data to output the mask.

The mask, in some examples, may represent a region in the voxel space associated with an object. The process 100, in other instances, may include generating a mask associated with an object in the voxel space. In both instances, either receiving the mask or generating the mask, the mask may be based at least in part on the sensor data captured in the operation 102. The process 100, in other instances, may include generating image data including segmentation information associated with a pixel. The segmentation information may indicate an orientation classification including data, such as, for example, direction information and distance information associated with an object that may be utilized to verify the accuracy of the mask and/or to further cluster the sensor data to segment objects.

An example 120 illustrates a top-down view or a plan view of multi-resolution voxel space 122. The example 120 also illustrates sensor data 124. For purposes of illustration, the sensor data 124 may be the sensor data captured at the operation 102 associated with an environment. The example 120 also illustrates a first mask 126 associated with the multi-resolution voxel space 122. The first mask 126 may represent an object in the voxel space and may be associated with an object shown in example 104.

As previously mentioned, in some examples, individual voxels of the voxels space 122 may comprise a plurality of features. As a non-limiting example, individual voxels may comprise features such as mean or average x-value coordinate, a mean or average y-value coordinate, a mean or average z-value coordinate, an average sensor intensity, semantic segmentation probabilities (that is, a set of probabilities indicating whether the voxel belongs to different classes of objects), an indication of previous occupancy (i.e., whether there is any data in the voxel or not), ray casting information (e.g., indicating whether a ray from a LIDAR has passed through a voxel), and the like. In some examples, the voxel space 122 may represent a "collapsed" version of the full multi-resolution voxel space as shown in the example 112. In other instances, the voxel space 122 may be represented or envisioned as a plurality of pseudo-pixels where each pseudo-pixel is associated with a column of voxels.

As a non-limiting example, individual pseudo-pixels may comprise or may be associated with all of the features of the voxels associated with the individual pseudo-pixel. As a non-limiting example, a voxel grid of dimensions 400× 400×7 may be represented as a 400×400 image with 49 channels. That is, the 49 channels may represent 7 channels for each of the voxel grid height times 7 features per height voxel.

At operation 130, the process 100 may include verifying the first mask representing the object using the segmentation data. In some examples, by outputting image data including segmentation information associated with the pixels of the image data, the system may verify and/or regenerate the first mask 126 associated with the object in the environment. In some examples, the direction information and distance information associated with a pixel may provide an indication of the direction toward the center of the object from the pixel and/or how far away the pixel is from the center of the object. Thus, for purposes of illustration, the system may verify the first mask based on the segmentation data indicating a threshold amount of direction and distance information associated with pixels corresponding to and/or proximal to the mask.

An example 130 illustrates a top-down view of the multi-resolution voxel space 122. The example 130 also illustrates the mask 126 as discussed in example 120. The example 130 additionally illustrates segmentation data 132 associated with the pixels as discussed above. Thus, for purposes of illustration, the segmentation data 132 may illustrate a verification and/or regeneration of the mask 126 by using clustering techniques based at least in part on a connected components algorithm.

Further, in some examples, the operation 110 may include clustering and/or segmenting, based at least in part on the mask 126 and/or segmentation data 132, the sensor data 124. In some examples, the mask 126 may be associated with a first object in the multi-resolution voxel space. Additionally, in some examples, the segmentation data 132 may be associated with the first object and/or a second object in the multi-resolution voxel space. Thus, for purposes of illustration, the system may segment the sensor data by segmenting the sensor data associated with the first mask directly, based on the segmentation data indicating two proximal pixels having differing orientation data, such that, for example, a first pixel may indicate a first direction and a second pixel neighboring the first pixel may indicate a second direction opposite the first. Additionally, the system may segment the sensor data associated with the voxels, where the voxels may be associated with the first mask and/or a second mask.

For purposes of illustration, the system may apply one or more clustering techniques, such as a connected components algorithm, to the sensor data or the voxels associated with the first mask to associate all nearby pixels indicating a direction toward a shared center point of a single object associated with the first mask. Additionally, the system may associate an object identifier (e.g., a unique object identifier) with the sensor data or the voxels associated with the first mask.

Additional details of the clustering and/or segmentation operations are discussed in connection with FIGS. 3-4B, as well as throughout this disclosure.

At operation 134, the process may include controlling a vehicle based at least in part on processing the multi-resolution voxel space. In some examples, the operation 134 may be performed by the vehicle 106. In some examples, the operation 134 may include generating a route, trajectory, and/or control signals for one or more systems of the vehicle 106 to navigate the vehicle 106 within the environment.

Figure 2:
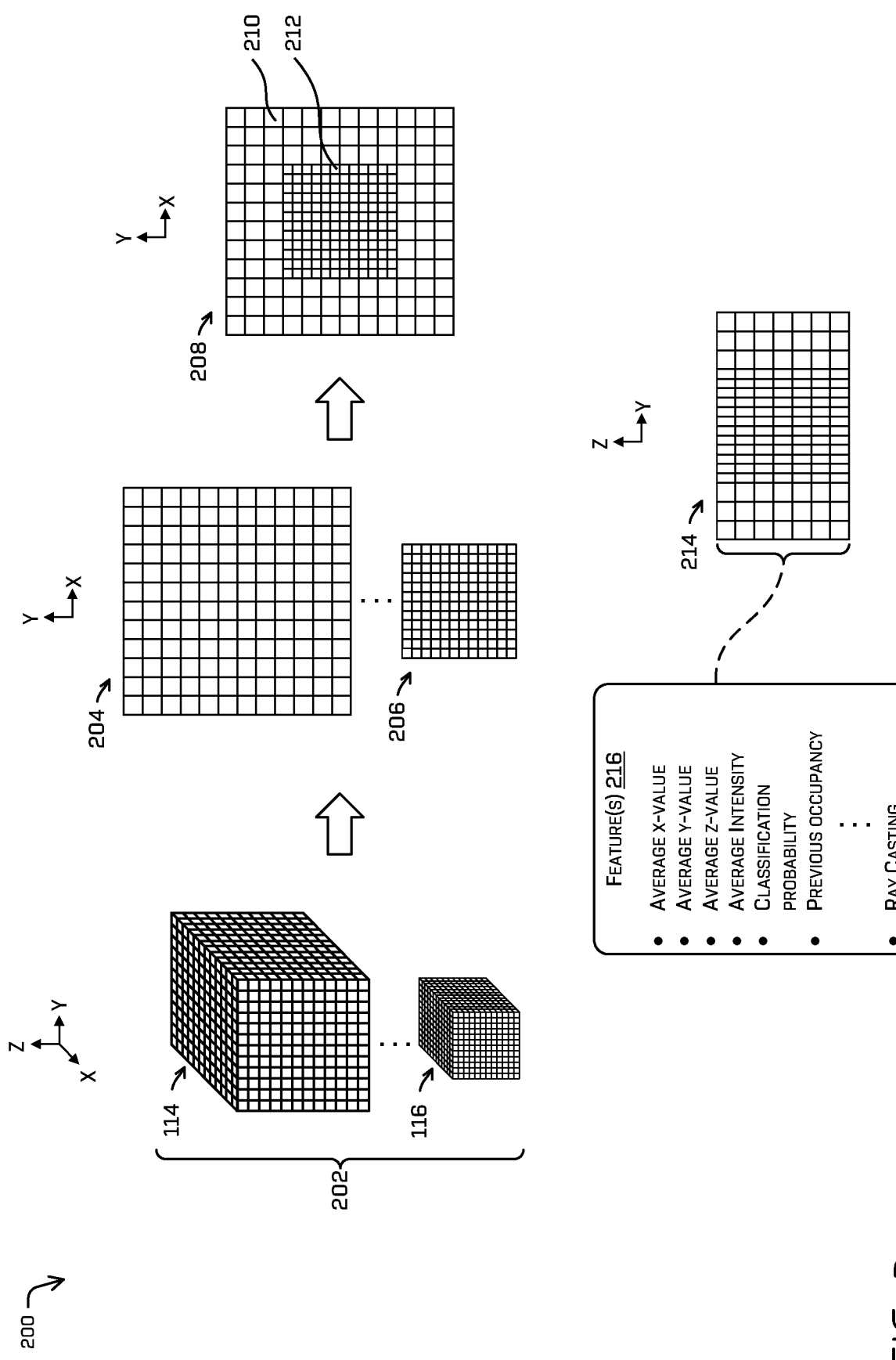
FIG. 2 depicts an example of a multi-resolution voxel space and multi-channel image data associated with the voxel space.

FIG. 2 depicts an example 200 of a multi-resolution voxel space 202 and multi-channel image data associated with the multi-resolution voxel space. In some examples, the multi-resolution voxel space 202 may correspond to the example voxel space 112 of FIG. 1.

The multi-resolution voxel space 202 is illustrated in three dimensions (e.g., x, y, z) and includes the first level 114 and the second level 116.

A two-dimensional representation (e.g., illustrating the x-y aspect of the first level 114) is illustrated as a first level 204. As discussed herein, the two-dimensional image data can comprise any number of channels representing sensor data and/or features.

A two-dimensional representation (e.g., illustrating the x-y aspect of the second level 116) is illustrated as a second level 206. As discussed herein, the two-dimensional image data can comprise any number of channels representing sensor data and/or features.

An example 208 depicts the levels 204 and 206 (or the levels 114 and 116) collocated with respect to the center of the first level 204 and the second level 206. In some examples, the center may correspond to a vehicle. That is, the voxel levels 204 and 206 may correspond to a portion of an environment proximate to a vehicle.

As may be seen by the example 208, some portions of a multi-resolution voxel space may be associated with one level, two levels, or any number of levels. For example, a point 210 may be associated with the first level 204. A point 212 may be associated with the second level 206. That is, the point 212 may be represented in a first voxel associated with the first level 204 and a second voxel associated with the second level 206, where the first voxel and the second voxel at least partially overlap.

In some examples, operations may include accumulating data in each voxel independently of other voxels and/or voxel levels. That is, sensor data may be represented in a voxel space as raw sensor data (e.g., with individual <x, y, z, range, time, etc.> values associated with data points) or may be represented as a statistical accumulation of data. For example, sensor data may be accumulated in the voxel space, with an individual voxel including processed data as features, such as, an average x-value of sensor data associated with the individual voxel, an average-y value of the sensor data associated with the individual voxel, an average z-value of the sensor data associated with the individual voxel, an average sensor intensity, semantic segmentation probabilities (that is, a set of probabilities indicating whether the voxel belongs to different classes of objects), an indication of previous occupancy (i.e., whether there is any data in the voxel or not), ray casting information (e.g., indicating whether a ray from a LIDAR has passed through a voxel), and the like. Sensor data may be accumulated independently for each voxel, even in the case where a voxel of one level at least partially overlaps a voxel of another level.

A two-dimensional representation (e.g., illustrating the y-z aspect of the multi-resolution voxel space 202) is illustrated as an example multi-channel image data 214 based on the multi-resolution voxel space 202. In some examples, the multi-channel image data 214 may include one or more layer(s) of image data. For example, the multi-channel image data 214 can include a first two-dimensional layer (e.g., first channel) associated with first feature data and a second two-dimensional layer (e.g., second channel) associated with second feature data. For example, the layer(s) of image data can include a layer of image data associated with a maximum height associated with each of the voxels of the voxel space, a layer of image data associated with a minimum height associated with each of the voxels, a layer of image data associated with an average height associated with each of the voxels, a layer of image data associated with a covariance associated with each of the voxels, a layer of image data associated with a surface normal associated with each of the voxels, a layer of image data associated with an average sensor intensity, a layer of image data indicating previous occupancy (i.e., whether there is any data in the voxel or not), a layer of image data indicating ray casting information (e.g., indicating whether a ray from a LIDAR has passed through a voxel), and/or a layer of image data associated with a classification probability associated with each of the voxels.

In some examples, the multi-dimensional image data can comprise layers associated with multiple classes of semantic information, although in some examples, data associated with certain classifications can be omitted from the multi-channel image data.

As a non-limiting example, multi-channel image data 214 may include a height (z-dimension) corresponding to the one or more features 216 associated with the voxels, such as, for example, a height of 7 corresponding to the features for a region of the three-dimensional multi-resolution voxel space, such as a column of voxels. As illustrated, the y-dimension may include voxels associated with the first level 204 and the second level 206 of the multi-resolution voxel space 202.

Figure 3:
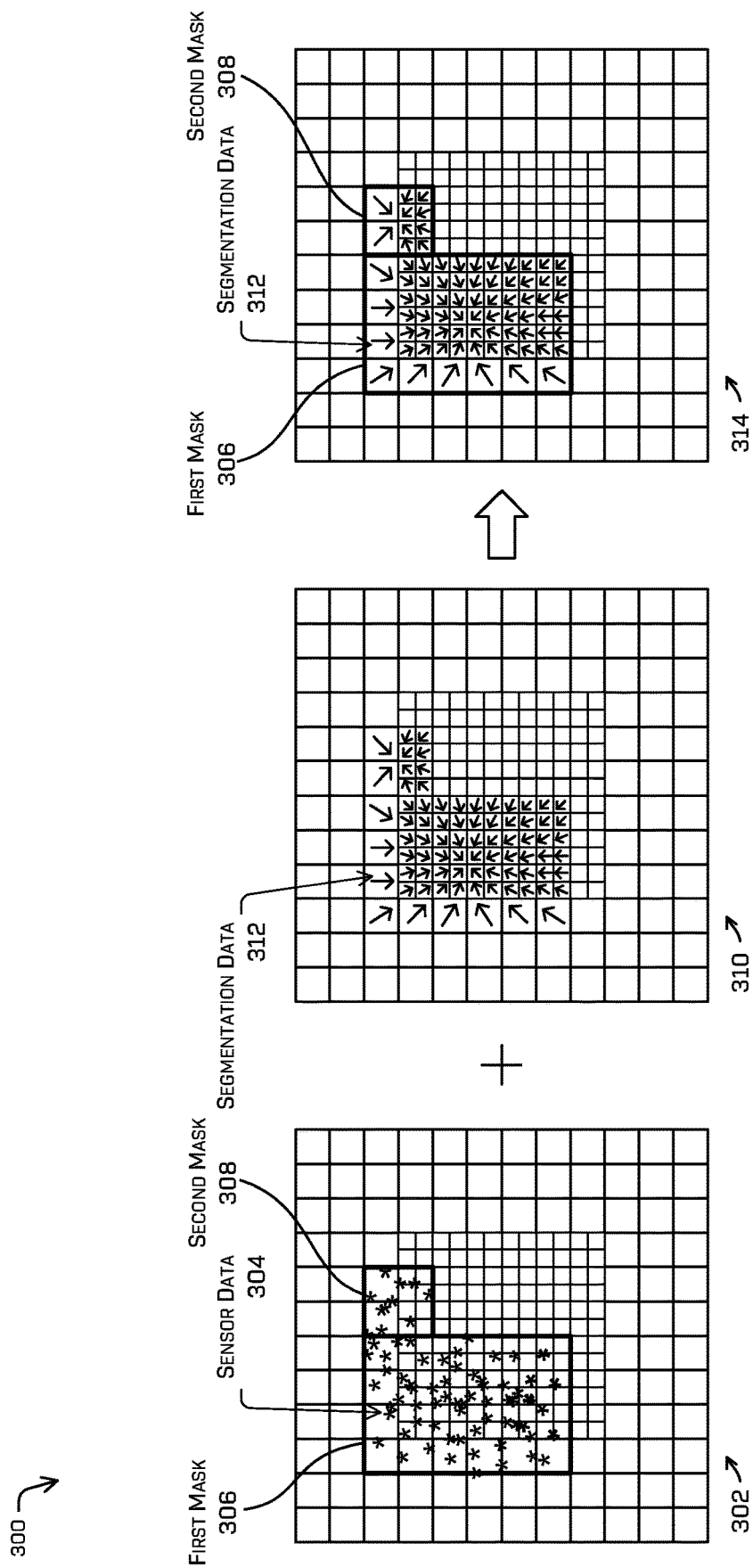
FIG. 3 depicts an example multi-resolution voxel space viewed from a top-down view and associating one or more mask(s) with segmentation data.

FIG. 3 depicts an example 300 of a multi-resolution voxel space 302, 310, and 314 viewed from a top-down view and how one or more mask(s) associated with respective portions of the voxel space may be used with segmentation data associated with the portions of the voxel space to verify the mask(s). As previously discussed, a machine learning algorithm may output the masks 306 and 308 and/or the segmentation data 312.

As shown, the example 300 illustrates sensor data 304, a first mask 306, and a second mask 308 associated with the multi-resolution voxel space 302. The first mask 306 and/or the second mask 308 may be generated by one or more machine learning algorithms and may indicate an object associated with a portion of the sensor data. For example, the first mask 306 may be associated with sensor data 304 that is neighboring sensor data 304 associated with a second mask 308. Additionally, or alternatively, the system may receive segmentation data 312 to confirm, or otherwise cluster and/or segment, the sensor data to verify the first mask 306 and the second mask 308, and potentially delineate a border between the two.

As shown, the example 300 illustrates segmentation data 312 associated with the sensor data associated with the multi-resolution voxel space 310. In some examples, the multi-resolution voxel space 310 may be the same voxel space as the multi-resolution voxel space 302 and/or 314. Additionally, or alternatively, the segmentation data 312 may be received separate from the first mask 306 and/or the second mask 308. The segmentation data may indicate an orientation classification, such as a direction and distance, of a pixel, corresponding to an object, with respect to the center of the object. Additional details of the orientation classification are discussed in connection with FIG. 4B, as well as throughout the disclosure. In some examples, orientation data may be utilized to delineate, or otherwise draw a boundary between two neighboring pixels. For example, a first pixel may indicate a first direction and a second pixel neighboring the first pixel may indicate a second direction opposite the first. This information may be used to delineate a boundary line between a first object associated with the first pixel and a second object associated with a second pixel, regardless of how close the objects may be.

Additionally, as shown, the example 300 illustrates utilizing the masks 306 and 308 and the segmentation data 312 in combination to verify the masks 306 and 308 associated with a multi-resolution voxel space 314. A boundary, or border, separating a first mask 306 from a second mask 308 may be determined and/or verified using the segmentation data 312 indicating the orientation classification associated with the pixels.

Figure 4A:
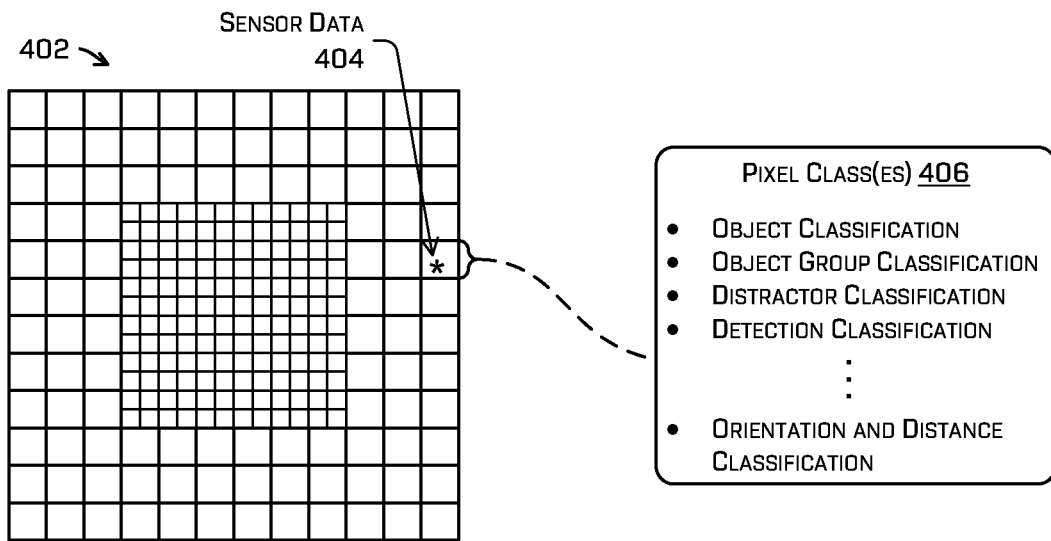
FIG. 4A depicts an example multi-resolution voxel space viewed from a top-down view and classification data associated with pixels corresponding to voxels in the voxel space.

FIG. 4A depicts an example multi-resolution voxel space 402 viewed from a top-down view and sensor data 404, indicating pixel classifications 406, associated with pixels corresponding to voxels in the voxel space 402. For example, sensor data captured by a sensor may be input to a machine learned model trained to determine semantic information about sensor data. The semantic information may indicate the pixel classifications 406 associated with the pixels corresponding to the voxels in the voxel space 402. An example of such a machine learned model and techniques for determining semantic information are discussed in, for example, in U.S. patent application Ser. No. 15/820, 245 titled "Sensor Data Segmentation" and filed Nov. 21, 2017, which is incorporated by reference herein in its entirety for all purposes.

In some examples, the pixel classifications 406 may correspond to a voxel, and may indicate various voxel classes, such as, for example, an object classification, an object group classification, a distractor classification, a detection classification, and/or an orientation and distance classification.

The object classification may include semantic segmentation probabilities, that is, a set of probabilities indicating whether the voxel belongs to different classes of objects (e.g., vehicles, pedestrians, bicycles, motorcycles, trees, road surfaces, buildings etc.). In certain examples, the object classification can indicate a probability or indication that a pixel or voxel is included with a specific object for use in clustering pixels or voxels of the specific object or segmentation of the specific object. The object group classification may include semantic segmentation probabilities, that is, a set of probabilities indicating whether the voxel belongs to different classes of object groups (e.g., groups containing objects of similar classifications). The distractor classification may include semantic segmentation probabilities, that is, a set of probabilities indicating whether the voxel belongs to a distractor class of objects (i.e., steam, fog, or the like). The detection classification may include semantic segmentation probabilities, that is, a set of probabilities indicating whether the pixel provides an accurate estimate of an associated mask and/or bounding box. The orientation and distance classification may provide an indication of the direction toward the center (or other feature) of an object associated with a pixel, from said pixel, and/or how far away the pixel is from the center of the object.

Figure 4B:
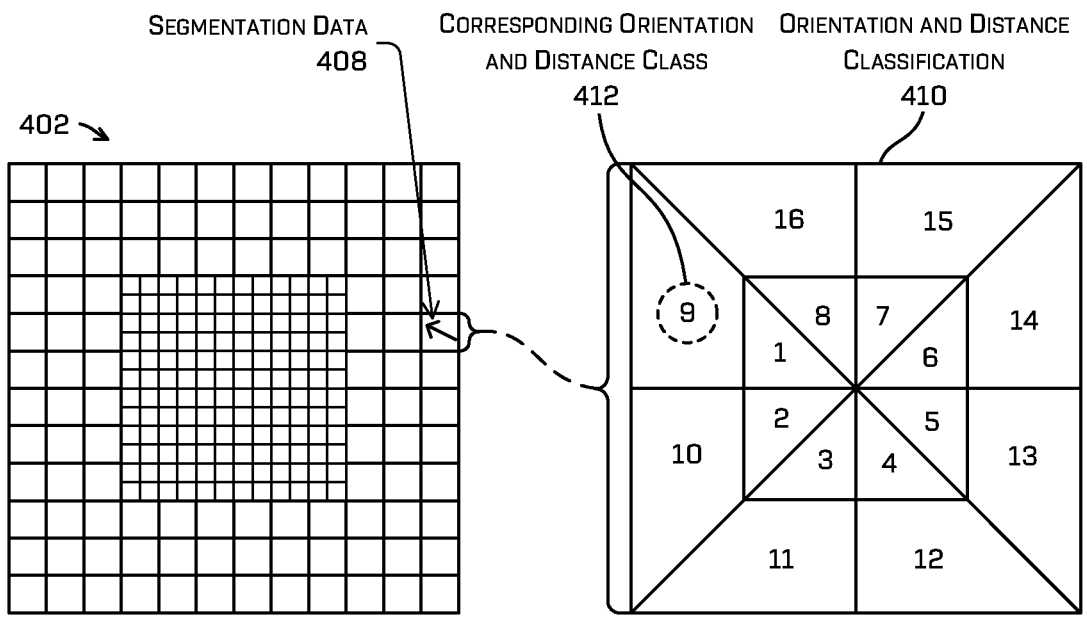
FIG. 4B depicts an example multi-resolution voxel space viewed from a top-down view and orientation and distance classification data associated with pixels corresponding to voxels in the voxel space.

FIG. 4B depicts an example multi-resolution voxel space 402 viewed from a top-down view and segmentation data 408, indicating an orientation and distance classification 410, associated with pixels corresponding to voxels in the voxel space 402.

As previously discussed, the orientation and distance classification 410 associated with a voxel may provide an indication of the direction toward the center of an object associated with a corresponding pixel, from the pixel, and/or how far away the pixel is from the center of the object.

In some examples, the direction information may be based on a class associated with the object, indicated by the pixel classes 406, and may provide direction information corresponding to the class. In some examples, the direction information may provide more specific direction information for a particular object class than others. For example, an object may be associated with a pedestrian class or the like, and a pixel of the object may include direction information, indicating a direction of four possible directions (e.g., two-dimensional quadrants) from the pixel to the center of the object. Additionally, or alternatively, an object may be associated with a car class, a bicycle class, or the like, and a pixel of the object may include direction information, indicating a direction of eight possible directions (e.g., represented as a two-dimensional octant) to the center of the object.

In some examples, the distance information may indicate a distance that the pixel is from a center of the object and may be determined with respect to other pixels associated with the object and/or based on a class associated with the object. For example, a first pixel located near an outer edge of an object may include distance information indicating that the first pixel is far from the center of the object. Additionally, or alternatively, a second pixel located near a center of an object may include distance information indicating that the second pixel is near the center of the object.

The orientation and distance classification 410 may encapsulate the direction information and the distance information by assigning a class to the data. In examples where 4 possible directions are contemplated, 8 classes may exist (e.g., 4 directions with 2 distance indicators for each direction). Additionally, or alternatively, where 8 possible directions are contemplated, 16 classes may exist (e.g., 8 directions with 2 distance indicators for each direction. As alluded to above, two classes may correspond to the same direction, while indicating differing distances. For example, where 4 possible directions are contemplated, class 1 and class 5 may indicate the same direction, while class 1 indicates that the pixel is near a center of an object and class 5 indicates that the pixel is far from a center of an object. Additionally, or alternatively, where 8 possible directions are contemplated, class 1 and class 9 may indicate the same direction, while class 1 indicates that the pixel is near a center of an object, and class 9 indicates that the pixel is far from a center of an object.

As a non-limiting example, the segmentation data 408 may correspond to an orientation and distance class 412. In a non-limiting example, the orientation and distance classification 410 may be based on an object associated with a class, such as, a car class, a bicycle class, or the like, and may indicate a direction of eight possible directions (e.g., represented as a two-dimensional octant) to the center of the object, and a distance (e.g., near or far) to the center of the object. For example, the corresponding orientation and distance class 412 of the segmentation data 408 associated with a voxel may correspond to orientation and distance class 412 indicating class 9. As such, this may indicate a direction from the voxel to a center of an object corresponding to the direction indicated by class 9, and a far distance from the center of the object.

As a further non-limiting example, a first pixel may neighbor a second pixel and a third pixel, that is, the first pixel may be sufficiently close or touching the second pixel and the third pixel. In such an example, the first pixel may correspond to segmentation data 408 comprising an orientation and distance classification indicating class 4 associated with the first pixel, the second pixel may correspond to segmentation data 408 comprising an orientation and distance classification indicating class 5 associated with the second pixel, and the third pixel may correspond to segmentation data 408 comprising an orientation and distance classification indicating class 1 associated with the third pixel. In such an example, the corresponding orientation and distance class 412 of the first pixel and the second pixel may indicate a shared edge, or in other words, that the first pixel and the second pixel indicate a substantially similar direction toward the center of an associated object such that they belong to the same object and may be clustered together. Additionally, the corresponding orientation and distance class 412 of the third pixel may indicate an opposite, or substantially opposite, orientation from the first and second pixel, such that, the third pixel belongs to an object that is separate from the first and second pixel, and may not be clustered with the first and second pixels.

Additionally, any pixels that are classified as close (e.g., within a threshold distance) to a center of the object may be clustered first to provide a first separation between objects. Next, pixels that are classified as far (e.g., exceeding the threshold distance) to the center of the object may be clustered second. In some examples, neighboring pixels of the far pixels may be identified until a neighboring pixel closest to a pixel in a cluster of close pixels is identified. The far pixel may then be included in the cluster of close pixels, based on the orientation information (e.g., the orientation information indicates a shared edge and/or a sufficiently similar orientation).

Figure 5A:
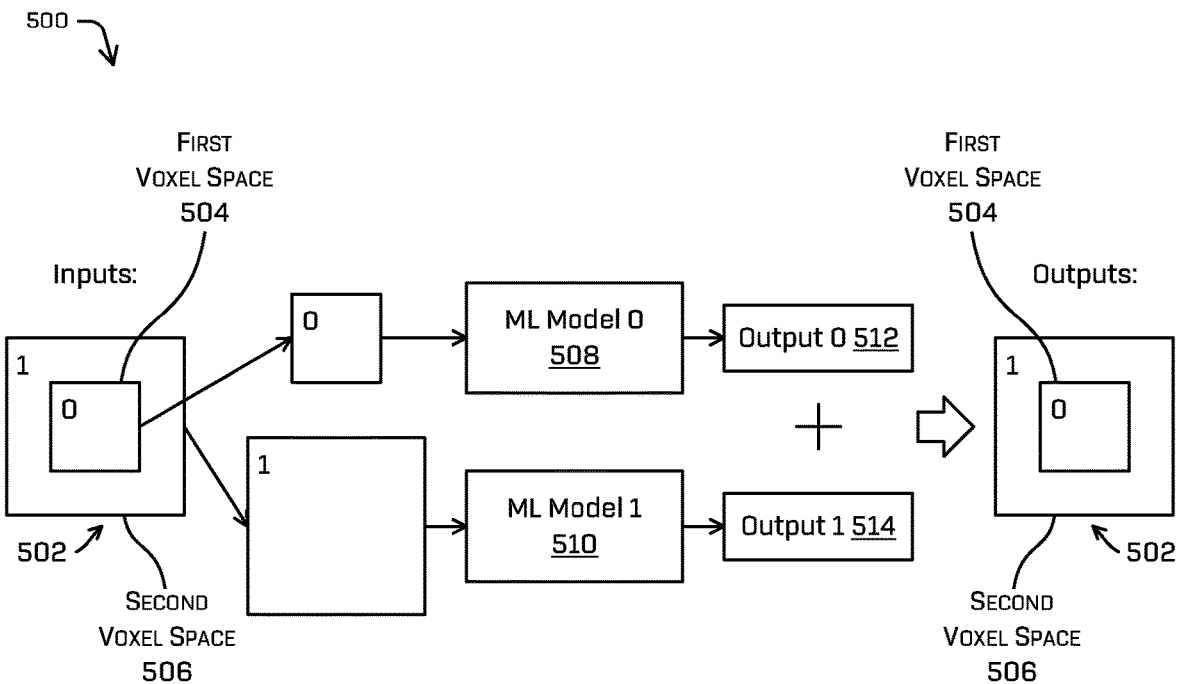
FIG. 5A depicts a block diagram of an example architecture for processing the multi-resolution voxel space using separate machine learned models.

FIG. 5A depicts a block diagram of an example architecture 500 of a system for processing the multi-resolution voxel space 502 using separate machine learned models.

As illustrated, a multi-resolution voxel space 502 may comprise a first voxel space 504 and a second voxel space 506. The multi-resolution voxel space 502 may correspond to the multi-resolution voxel space 112 and/or 202 described above with respect to FIGS. 1 and 2. Additionally, the first voxel space 504 and the second voxel space 506 may correspond to the first and second voxel spaces 114 and 116 and/or 204 and 206 described above with respect to FIGS. 1 and 2.

The system may receive the multi-resolution voxel space 502 as an input. For example, the system may receive the first voxel space 504 as an input for the first machine learned model 508 and may receive the second voxel space 506 as an input for the second machine learned model 510. The machine learned models 508 and 510 may process the data to identify classes in the data, features in the data, output segmentation masks, and the like. The machine learned model 508 may produce an output 512 corresponding to the first voxel space 504. The machine learned model 510 may produce an output corresponding to the second voxel space 506.

In some examples, the system may be configured to combine the output 512 associated with the first voxel space 504 and the output 514 associated with the second voxel space 506 to produce an output associated with the multi-resolution voxel space 502.

Figure 5B:
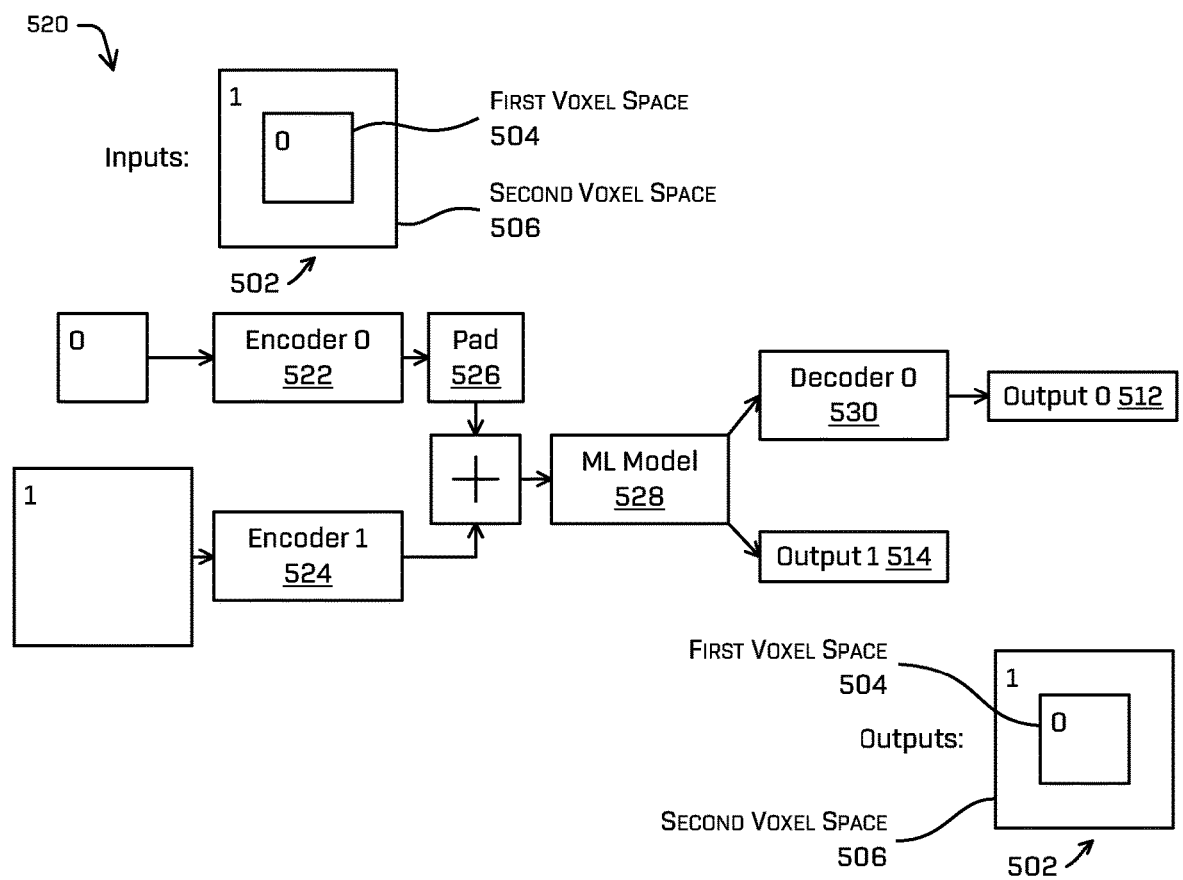
FIG. 5B depicts a block diagram of an example architecture for processing the multi-resolution voxel space using a single machine learned model.

FIG. 5B depicts a block diagram of an example architecture 520 of a system for processing the multi-resolution voxel space 502 using a single machine learned model.

As illustrated, a multi-resolution voxel space 502 may comprise a first voxel space 504 and a second voxel space 506. The multi-resolution voxel space 502 may correspond to the multi-resolution voxel space 112 and/or 202 described above with respect to FIGS. 1 and 2. Additionally, the first voxel space 504 and the second voxel space 506 may correspond to the first and second voxel spaces 114 and 116 and/or 204 and 206 described above with respect to FIGS. 1 and 2.

The system may receive the multi-resolution voxel space 502 (which may be represented as multi-channel image data, from a top-down or other view) as an input. For example, the system may receive the first voxel space 504 as an input for an encoder 522 configured to encode data associated with the first voxel space 504 and may receive the second voxel space 506 as an input for an encoder 524 configured to encode data associated with the second voxel space 508. As illustrated, the encoders 522 and 524 may transform the data in various ways, such as, downsampling and/or utilizing a padding component 526 to align the plurality of voxel spaces in a multi-resolution voxel space (or a plurality of multi-channel images) for efficient and/or accurate processing by a single machine learned model 528.

For example, the multi-resolution voxel space 502 may include a first voxel space 504 (or a first multi-channel image associated with a top-down or other view) comprising a first range and a second voxel space 506 (or a second multi-channel image associated with a top-down or other view) comprising a second range, where the first range is less than the second range. By way of example and not limitation, the first range may extend 50 meters and the second range may extend 100 meters. Short-range image data representing a top-down view of the first voxel space 504 and long-range image data representing a top-down view of the second voxel space 506 may be determined. By way of example, and not limitation, the short-range image data may comprise an 800-pixel by 800-pixel (800×800) high-resolution image (e.g., comprised of fine pixel) representing the first 50-meter range, and the long-range image data may comprise an 800×800 low-resolution image (e.g., comprised of coarse pixels, such as, for example, a pixel twice as coarse as a fine pixel) representing the second 100-meter range. Aligning the high-resolution image with the low-resolution image, as is, for training and/or inferencing may lead to inconsistent and/or unpredictable results.

As such, the short-range image data comprising the high-resolution image may be input into the encoder 522 to downsample the high-resolution image, by a factor of two, for example, and determine downsampled short-range image data. The downsampled short-range image data may comprise 400-pixel by 400-pixel (400×400) low-resolution image representing the first 50-meter range. With the short-range image data and the long-range image data comprising low-resolution images, the images may be properly aligned to represent the top-down view of the multi-resolution voxel space 502, such as, for example, overlaying the short-range image data representing the first voxel space 504 on the long-range image data representing the second voxel space 506 and aligning a center of the short-range image data with a center of the long-range image data.

The encoder 522 may encode the pixels such that, the data included in high-resolution pixels corresponding to a low-resolution pixel may be preserved by decoding the corresponding low-resolution pixel with a corresponding decoder 530.

Additionally, or alternatively, the downsampled image data may be further transformed to further improve and/or reduce the chance of error associated with the alignment of the images. For example, the downsampled short-range image data may be input into a padding component 526, configured to pad, or otherwise fill in, the downsampled short-range image data from the first range (50-meters) out to the second range to align the rows and columns of the downsampled short-range image data with the rows and columns of the long-range image data. Padding the downsampled short-range image data may result in an 800×800 low-resolution image, such that, an inner 400×400 portion of the image data may represent the first 50-meter range associated with the first voxel space 504, and the outer portion or the image data may include empty, or otherwise ignored data. This padding of the downsampled image data eliminates any margin for error when aligning the images, as both are represented as an 800×800 low-resolution image, and the padded portion of the downsampled short-range image data may be empty or otherwise ignored by the system, in favor of the long-range image data, associated with the second voxel space 506, corresponding to the padded portion, during training and/or inferencing.

As previously mentioned, decoder 530 may be configured to decode the output data corresponding to the first voxel space 504 received from the machine learned model 528 and restore the high-resolution data for output 512. Additionally, or alternatively, a separate decoder may be configured to decode the output data corresponding to the second voxel space 506 received from the machine learned model 528 for output 514.

In some examples, the system may be configured to combine the output 512 associated with the first voxel space 504 and the output 514 associated with the second voxel space 506 to produce an output associated with the multi-resolution voxel space 502.

Figure 6:
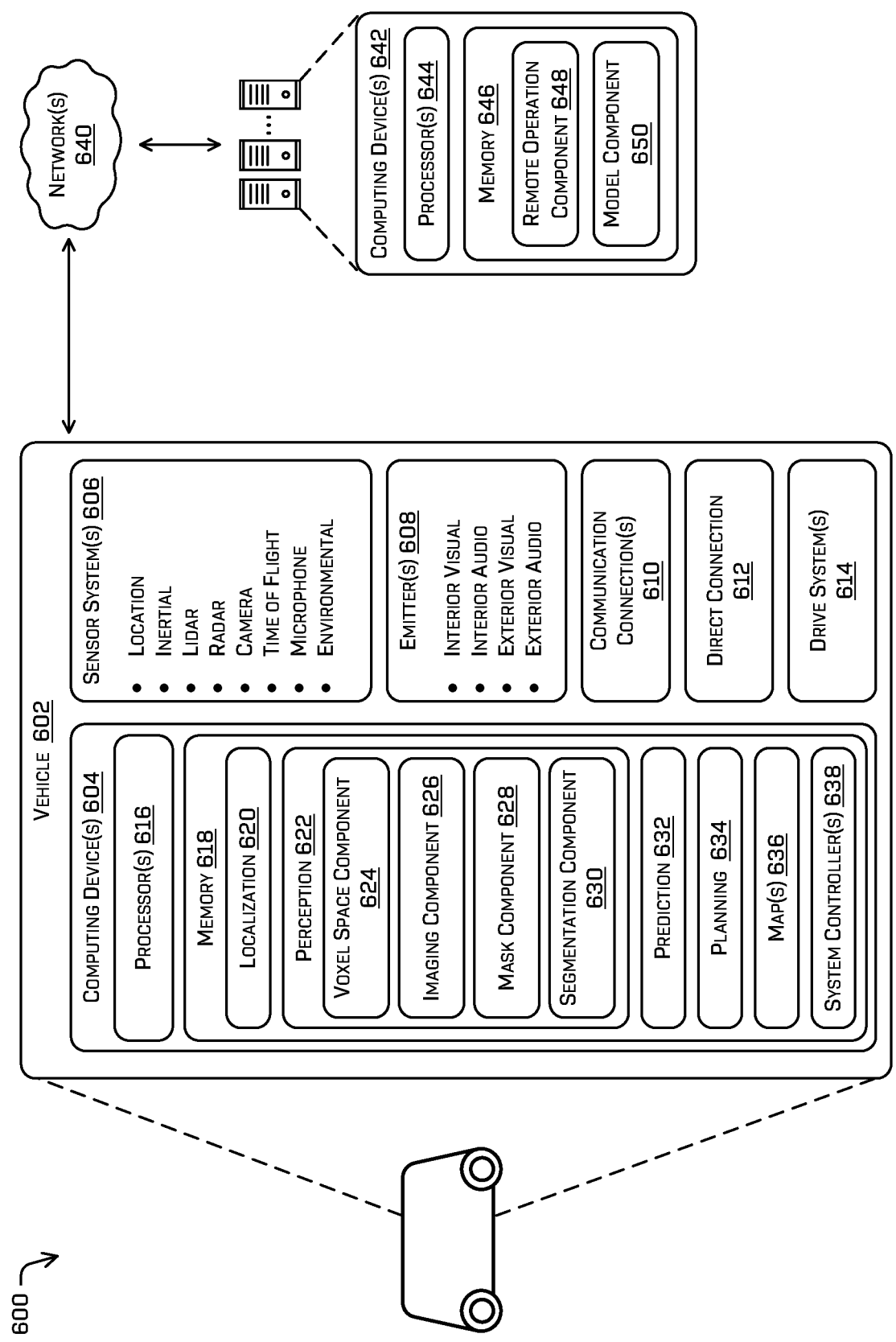
FIG. 6 is a block diagram of an example system for implementing the techniques described herein.

FIG. 6 is a block diagram of an example system for implementing the techniques described herein. In at least one example, the system 400 may include a vehicle 602. In the illustrated example system 400, the vehicle 602 is an autonomous vehicle; however, the vehicle 602 may be any other type of vehicle.

The vehicle 602 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 602 may be configured to control all functions from start to completion of the trip, including all parking functions, it may not include a driver and/or controls for driving the vehicle 602, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The vehicle 602 may include one or more computing device(s) 604, one or more sensor system(s) 606, one or more emitter(s) 608, one or more communication connection(s) 610 (also referred to as communication devices and/or modems), at least one direct connection 612 (e.g., for physically coupling with the vehicle 602 to exchange data and/or to provide power), and one or more drive system(s) 614. The one or more sensor system(s) 606 may be configured to capture sensor data associated with an environment.

The one or more sensor system(s) 606 may include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The one or more sensor system(s) 606 may include multiple instances of each of these or other types of sensors. For instance, the time-of-flight sensors may include individual time-of-flight sensors located at the corners, front, back, sides, and/or top of the vehicle 602. As another example, the camera sensors may include multiple cameras disposed at various locations about the exterior and/or interior of the vehicle 602. The one or more sensor system(s) 606 may provide input to the computing device 604.

The vehicle 602 may also include one or more emitter(s) 608 for emitting light and/or sound. The one or more emitter(s) 608 in this example include interior audio and visual emitters to communicate with passengers of the vehicle 602. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 608 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 602 may also include one or more communication connection(s) 610 that enable communication between the vehicle 602 and one or more other local or remote computing device(s) (e.g., a remote teleoperation computing device) or remote services. For instance, the one or more communication connection(s) 610 may facilitate communication with other local computing device(s) on the vehicle 602 and/or the one or more drive system(s) 614. Also, the one or more communication connection(s) 610 may allow the vehicle 602 to communicate with other nearby computing device(s) (e.g., other nearby vehicles, traffic signals, etc.).

The one or more communications connection(s) 610 may include physical and/or logical interfaces for connecting the computing device 604 to another computing device or one or more external networks 640 (e.g., the Internet). For example, the one or more communications connection(s) 610 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

In at least one example, the vehicle 602 may include one or more drive system(s) 614. In some examples, the vehicle 602 may have a single drive system 614. In at least one example, if the vehicle 602 has multiple drive systems 614, individual drive systems 614 may be positioned on opposite ends of the vehicle 602 (e.g., the front and the rear, etc.). In at least one example, the drive system(s) 614 may include one or more sensor system(s) 606 to detect conditions of the drive system(s) 614 and/or the surroundings of the vehicle 602. By way of example and not limitation, the sensor system(s) 606 may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 614. In some cases, the sensor system(s) 606 on the drive system(s) 614 may overlap or supplement corresponding systems of the vehicle 602 (e.g., sensor system(s) 606).

The drive system(s) 614 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 may include a drive system controller which may receive and preprocess data from the sensor system(s) 606 and to control operation of the various vehicle systems. In some examples, the drive system controller may include one or more processor(s) and memory communicatively coupled with the one or more processor(s). The memory may store one or more components to perform various functionalities of the drive system(s) 614. Furthermore, the drive system(s) 614 also include one or more communication connection(s) that enable communication by the respective drive system with one or more other local or remote computing device(s).

The computing device 604 may include one or more processor(s) 616 and memory 618 communicatively coupled with the one or more processor(s) 616. In the illustrated example, the memory 618 of the computing device 604 stores a localization component 620, a perception component 622 comprising a height component 424, a classification component 426, a prediction component 632, a planning component 634, a maps component 636, and one or more system controller(s) 638. Though depicted as residing in the memory 618 for illustrative purposes, it is contemplated that the localization component 620, the perception component 622, the voxel space component 624, the imaging component 626, the mask component 628, the segmentation component 630, the prediction component 632, the planning component 634, the maps component 636, and the one or more system controller(s) 638 may additionally, or alternatively, be accessible to the computing device 604 (e.g., stored in a different component of vehicle 602) and/or be accessible to the vehicle 602 (e.g., stored remotely).

In memory 618 of the computing device 604, the localization component 620 may include functionality to receive data from the sensor system(s) 606 to determine a position of the vehicle 602. For example, the localization component 620 may include and/or request/receive a three-dimensional map of an environment and may continuously determine a location of the autonomous vehicle within the map. In some examples, the localization component 620 may use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some examples, the localization component 620 may provide data to various components of the vehicle 602 to determine an initial position of an autonomous vehicle for generating a trajectory, as discussed herein.

The perception component 622 may include functionality to perform object detection, segmentation, and/or classification. In some examples, the perception component 622 may provide processed sensor data that indicates a presence of an entity that is proximate to the vehicle 602 and/or a classification of the entity as an entity type (e.g., car, pedestrian, cyclist, building, tree, road surface, curb, sidewalk, unknown, etc.). In additional and/or alternative examples, the perception component 622 may provide processed sensor data that indicates one or more characteristics associated with a detected entity and/or the environment in which the entity is positioned. In some examples, characteristics associated with an entity may include, but are not limited to, an x-position (global position), a y-position (global position), a z-position (global position), an orientation, an entity type (e.g., a classification), a velocity of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

As described above, the perception component 622 may use perception algorithms to determine a perception-based bounding box associated with an object in the environment based on sensor data. For example, the perception component 622 may receive image data and classify the image data to determine that an object is represented in the image data. Then, using detection algorithms, the perception component 622 may generate a two-dimensional bounding box and/or a perception-based three-dimensional bounding box associated with the object. The perception component 622 may further generate a three-dimensional bounding box associated with the object. As discussed above, the three-dimensional bounding box may provide additional information such as a location, orientation, pose, and/or size (e.g., length, width, height, etc.) associated with the object.

The perception component 622 may include functionality to store perception data generated by the perception component 622. In some examples, the perception component 622 may determine a track corresponding to an object that has been classified as an object type. For purposes of illustration only, the perception component 622, using sensor system(s) 606 may capture one or more images of an environment. The sensor system(s) 606 may capture images of an environment that includes an object, such as a pedestrian. The pedestrian may be at a first position at a time T and at a second position at time T+t (e.g., movement during a span of time t after time T). In other words, the pedestrian may move during this time span from the first position to the second position. Such movement may, for example, be logged as stored perception data associated with the object.

The stored perception data may, in some examples, include fused perception data captured by the vehicle. Fused perception data may include a fusion or other combination of sensor data from sensor system(s) 606, such as image sensors, lidar sensors, radar sensors, time-of-flight sensors, sonar sensors, global positioning system sensors, internal sensors, and/or any combination of these. The stored perception data may additionally or alternatively include classification data including semantic classifications of objects (e.g., pedestrians, vehicles, buildings, road surfaces, etc.) represented in the sensor data. The stored perception data may additionally or alternatively include track data (positions, orientations, sensor features, etc.) corresponding to motion of objects classified as dynamic objects through the environment. The track data may include multiple tracks of multiple different objects over time. This track data may be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

The voxel space component 624 may include functionality to receive sensor data and associate the sensor data with one or more voxel spaces, as a multi-resolution voxel space, where the voxel space comprising, in some examples, three dimensions. In some examples, the voxel space component 624 may include functionality to statistically accumulate sensor data and process the sensor as it is associated with individual voxels. In other instances, the voxel space component 624 may include functionality to associate the sensor data with a voxel space as raw sensor data (e.g., with individual <x, y, z, range, time, etc.> values associated with data points).

The imaging component 626 may include functionality to determine a top-down representation (or a representation from any view) of a multi-resolution voxel space. The top-down representation of the voxel space may be used to determine mask(s) associated with object(s) and/or image data indicating segmentation data for clustering and/or segmenting the data. Examples of such top-down segmentation techniques are discussed in, for example, in U.S. patent application Ser. No. 15/963,833 titled "Data Segmentation Using Masks" and filed Apr. 26, 2018, which is incorporated by reference herein in its entirety.

The mask component 628 may include functionality to validate a first mask representing an object using image data including segmentation data associated with pixels of the image data and/or to generate a second mask associated with the object based at least in part on the segmentation data indicating an orientation and distance toward the center of the object from the pixel and/or how far away the pixel is from the center of the object.

The segmentation component 630 may include functionality to segment the sensor data associated with the mask to associate an object and/or an object identifier with the sensor data associated with the mask. In some examples, the segmentation component 630 may apply one or more clustering techniques, such as a connected components algorithm, to the sensor data or the voxels associated with the second mask to determine the object in the voxel space. Additionally, the segmentation component 630 may, in some examples, associate an object identifier with the sensor data or the voxels associated with the second mask.

The prediction component 632 may generate one or more probability maps representing prediction probabilities of possible locations of one or more objects in an environment. For example, the prediction component 632 may generate one or more probability maps for vehicles, pedestrians, animals, and the like within a threshold distance from the vehicle 602. In some examples, the prediction component 632 may measure a track of an object and generate a discretized prediction probability map, a heat map, a probability distribution, a discretized probability distribution, and/or a trajectory for the object based on observed and predicted behavior. In some examples, the one or more probability maps may represent an intent of the one or more objects in the environment.

The planning component 634 may determine a path for the vehicle 602 to follow to traverse through an environment. For example, the planning component 634 may determine various routes and paths and various levels of detail. In some examples, the planning component 634 may determine a route to travel from a first location (e.g., a current location) to a second location (e.g., a target location). For the purpose of this discussion, a route may be a sequence of waypoints for traveling between two locations. As non-limiting examples, waypoints include streets, intersections, global positioning system (GPS) coordinates, etc. Further, the planning component 634 may generate an instruction for guiding the autonomous vehicle along at least a portion of the route from the first location to the second location. In at least one example, the planning component 634 may determine how to guide the autonomous vehicle from a first waypoint in the sequence of waypoints to a second waypoint in the sequence of waypoints. In some examples, the instruction may be a path, or a portion of a path. In some examples, multiple paths may be substantially simultaneously generated (i.e., within technical tolerances) in accordance with a receding horizon technique. A single path of the multiple paths in a receding data horizon having the highest confidence level may be selected to operate the vehicle.

In other examples, the planning component 634 may alternatively, or additionally, use data from the perception component 622 and/or the prediction component 632 to determine a path for the vehicle 602 to follow to traverse through an environment. For example, the planning component 634 may receive data from the perception component 622 and/or the prediction component 632 regarding objects associated with an environment. Using this data, the planning component 634 may determine a route to travel from a first location (e.g., a current location) to a second location (e.g., a target location) to avoid objects in an environment. In at least some examples, such a planning component 634 may determine there is no such collision free path and, in turn, provide a path which brings vehicle 602 to a safe stop avoiding all collisions and/or otherwise mitigating damage.

The memory 618 may further include one or more maps 636 that may be used by the vehicle 602 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some examples, a map may include, but is not limited to: covariance data (e.g., represented in a multi-resolution voxel space), texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the map may be stored in a tiled format, such that individual tiles of the map represent a discrete portion of an environment, and may be loaded into working memory as needed, as discussed herein. In at least one example, the one or more maps 636 may include at least one map (e.g., images and/or a mesh). In some examples, the vehicle 602 may be controlled based at least in part on the map(s) 636. That is, the map(s) 636 may be used in connection with the localization component 620, the perception component 622 (and sub-components), the prediction component 632, and/or the planning component 634 to determine a location of the vehicle 602, identify objects in an environment, generate prediction probabilit(ies) associated with objects and/or the vehicle 602, and/or generate routes and/or trajectories to navigate within an environment.

In at least one example, the computing device 604 may include one or more system controller(s) 638, which may be configured to control steering, propulsion, braking, safety, emitters, communication, and other systems of the vehicle 602. These system controller(s) 638 may communicate with and/or control corresponding systems of the drive system(s) 614 and/or other components of the vehicle 602, which may be configured to operate in accordance with a path provided from the planning component 634.

The vehicle 602 may connect to computing device(s) 642 via network 640 and may include one or more processor(s) 644 and memory 646 communicatively coupled with the one or more processor(s) 644. In at least one instance, the one or more processor(s) 644 may be similar to the processor(s) 616 and the memory 646 may be similar to the memory 618. In the illustrated example, the memory 646 of the computing device(s) 642 stores a remote operation component 648 and/or a model component 650. In at least one instance, the model component 650, after empirical testing and/or simulations, may generate ML models to be used by the perception component 622, as discussed herein. Though depicted as residing in the memory 646 for illustrative purposes, it is contemplated that the remote operation component 648 and the model component 650 may additionally, or alternatively, be accessible to the computing device(s) 642 (e.g., stored in a different component of computing device(s) 642 and/or be accessible to the computing device(s) 642 (e.g., stored remotely).

The model component 650 may include functionality to generate models for determining segmentation information, classification information, etc. for multi-channel image data, as discussed herein.

The processor(s) 616 of the computing device 604 and the processor(s) 644 of the computing device(s) 642 may be any suitable processor capable of executing instructions to process data and perform operations as described herein. By way of example and not limitation, the processor(s) 616 and 644 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

The memory 618 computing device 604 and the memory 646 of the computing device(s) 642 are examples of non-transitory computer-readable media. The memory 618 and 646 may store an operating system and one or more software applications, instructions, programs, and/or data to implement the methods described herein and the functions attributed to the various systems. In various implementations, the memory 618 and 646 may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some examples, aspects of some or all of the components discussed herein may include any models, algorithms, and/or machine-learning algorithms. For example, in some examples, the components in the memory 618 and 646 may be implemented as a neural network.

As described herein, an exemplary neural network is an algorithm that passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning or machine-learned algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

FIGS. 1, 3, 7, and 8 illustrate example processes in accordance with examples of the disclosure. These process are illustrated as a logical flow graph, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be omitted or combined in any order and/or in parallel to implement the processes.

Figure 7:
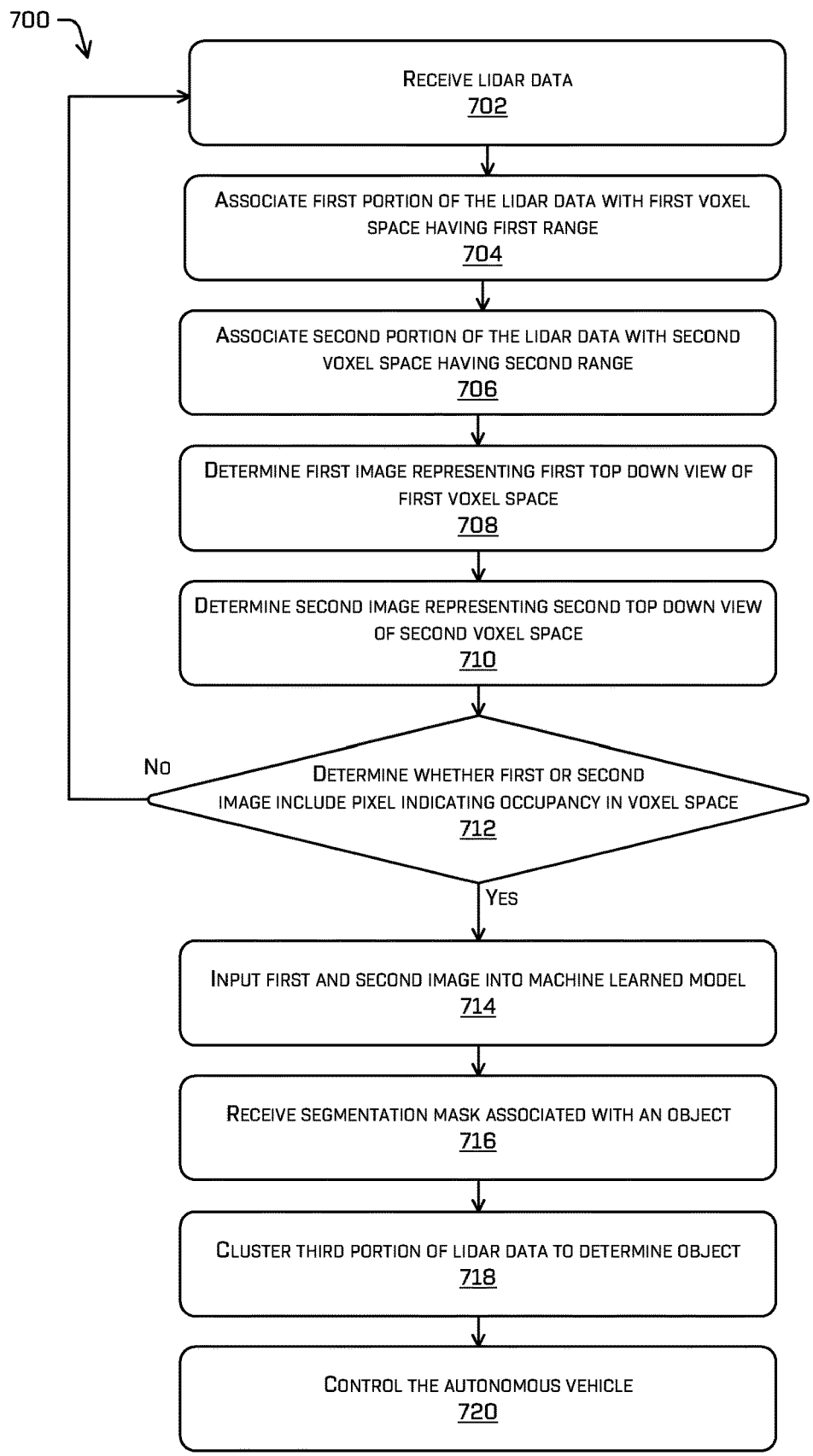
FIG. 7 is an example process for clustering sensor data to determine an object based on top-down segmentation of a multi-resolution voxel space.

FIG. 7 is an example process 700 for clustering sensor data to determine an object based on top-down segmentation of a multi-resolution voxel space. For example, some or all of the process 700 may be performed by one or more components in FIG. 6, as described herein. For example, some or all of the process 700 may be performed by the voxel space component 624, the imaging component 626, the mask component 628, and/or the segmentation component 630.

At operation 702, the process may include receiving sensor data of an environment. In some examples, the operation 702 may include receiving and/or capturing time of flight data, lidar data, image data, radar data, and the like, of an environment. In some examples, the operation 702 may be performed by a vehicle (e.g., an autonomous vehicle) as the vehicle traverses the environment.

At operation 704, the process may include associating a first portion of the sensor data with a first voxel space having a first range. In some examples, a first voxel space may correspond to the second voxel space 116. In some examples, the operation 704 may include statistically accumulating sensor data and processing the data as it is added to individual voxels. For example, individual voxels may include data representing a number of data points, an average intensity, an average x-value of the data, an average y-value of the data, an average z-value of the data, and/or a covariance matrix based on the sensor data associated with the individual voxel. Thus, in some examples, data associated with individual voxels may represent processed data, in part, to improve processing performance of the system.

At operation 706, the process may include associating a second portion of the sensor data with a second voxel space. In some examples, a second voxel space may correspond to the first voxel space 114. In some examples, the first range may be less than the second range. In some examples, the operation 706 may include statistically accumulating sensor data and processing the data as it is added to individual voxels. For example, individual voxels may include data representing a number of data points, an average intensity, an average x-value of the data, an average y-value of the data, an average z-value of the data, and/or a covariance matrix based on the sensor data associated with the individual voxel. Thus, in some examples, data associated with individual voxels may represent processed data, in part, to improve processing performance of the system.

At operation 708, the process may include determining first multi-channel image data representing a first top-down view of the first voxel space. In some examples, the first top-down view may correspond to the top-down view 206. In some examples, a first pixel of the first image data may indicate an occupancy of a first column of the first voxel space. Additionally, or alternatively, the process may determine the first image data representing a top-down view of the multi-resolution voxel space including the first voxel space and the second voxel space. Of course, other views can be used, and the techniques are not limited to a top-down view.

At operation 710, the process may include determining second multi-channel image data representing a second top-down view of the second voxel space. In some examples, the second top-down view may correspond to the top-down view 204. In some examples, a second pixel of the second image data may indicate an occupancy of a second column of the second voxel space. Additionally, or alternatively, the process may determine the first image data representing a top-down view of the multi-resolution voxel space including the first voxel space and the second voxel space. Of course, other views can be used, and the techniques are not limited to a top-down view.

At operation 712, the process may include determining whether the first image multi-channel data and/or the second multi-channel image data include the first pixel and/or the second pixel. If the process determines that the first image data and/or the second image data does not include the first pixel and/or the second pixel indicating occupancy in the voxel space, the process may return to operation 702 to receive further sensor data. Alternatively, if the process determines that the first image data and/or the second image data does include the first pixel and/or the second pixel indicating occupancy in the voxel space, the process may proceed to operation 714.

At operation 714, the process may include inputting the first multi-channel image data and/or the second multi-channel image data into a machine learned model, where the machine learned model may process the multi-channel image data to determine a segmentation mask.

At operation 716, the process may include receiving, from the machine learned model, a segmentation mask associated with an object in the multi-resolution voxel space, the first voxel space, and/or the second voxel space.

At operation 718, the process may include clustering a third portion of the sensor data to determine the object. In some examples, the clustering may be based at least in part on the mask. In some examples, the process may include using one or more clustering techniques, such as a connected components algorithm, to determine semantic and/or segmentation information associated with the object.

At operation 720, the process may include controlling a vehicle based at least in part on the object. In some examples, the operation 720 may include generating a trajectory to stop the vehicle or to otherwise control the vehicle to safely traverse the environment. In some examples, the operation 720 may include modifying a candidate trajectory based on detected objects, for example, to determine a modified trajectory for the vehicle to follow in the environment.

Figure 8:
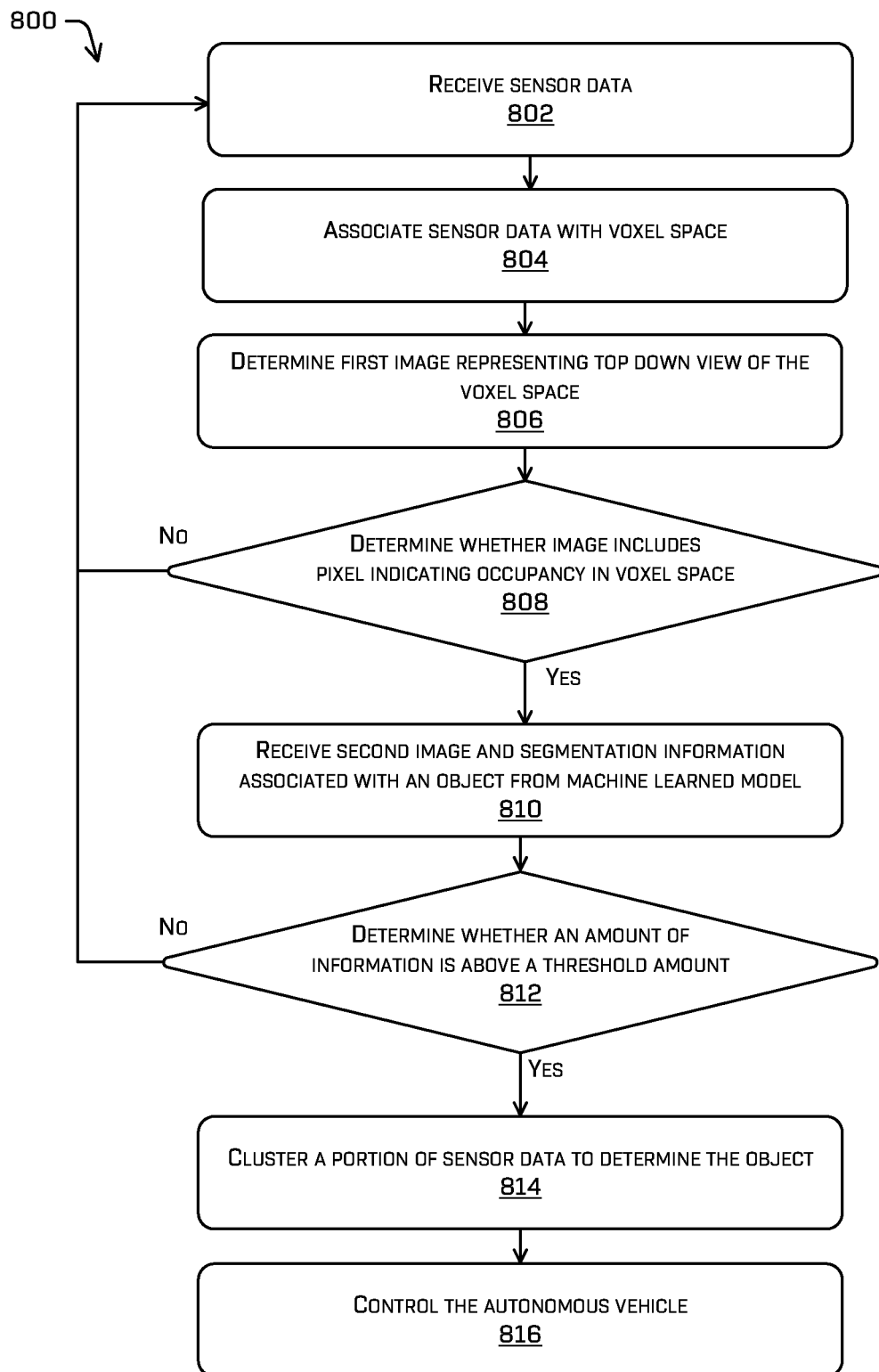
FIG. 8 is an example process for clustering sensor data to determine an object based on segmentation data associated with an image representing a top-down view of a voxel space.

FIG. 8 is an example process 800 for clustering sensor data to determine an object based on segmentation data associated with an image representing a top-down view of a voxel space (which may be represented as a multi-channel image from a top-down or other view). For example, some or all of the process 800 may be performed by one or more components in FIG. 6, as described herein. For example, some or all of the process 800 may be performed by the voxel space component 624, the imaging component 626, the mask component 628, and/or the segmentation component 630.

At operation 802, the process may include receiving sensor data of an environment. In some examples, the operation 802 may include receiving and/or capturing time of flight data, lidar data, image data, radar data, and the like, of an environment. In some examples, the operation 802 may be performed by a vehicle (e.g., an autonomous vehicle) as the vehicle traverses the environment.

At operation 804, the process may include associating the sensor data with a three-dimensional voxel space. In some examples, a voxel space may correspond to the multi-resolution voxel space 112, the first voxel space 114, and/or the second voxel space 116. In some examples, the operation 804 may include statistically accumulating sensor data and processing the data as it is added to individual voxels. For example, individual voxels may include data representing a number of data points, an average intensity, an average x-value of the data, an average y-value of the data, an average z-value of the data, and/or a covariance matrix based on the sensor data associated with the individual voxel. Thus, in some examples, data associated with individual voxels may represent processed data, in part, to improve processing performance of the system.

At operation 806, the process may include determining first multi-channel image data representing a first top-down view of the voxel space. In some examples, the first top-down view may correspond to the first top-down view 204, the second top-down view 206, and/or the multi-resolution top-down view 208. In some examples, a first pixel of the first image data may indicate an occupancy of a first column of the voxel space.

At operation 808, the process may include determining whether the first multi-channel image data includes the first pixel. If the process determines that the first image data does not include the first pixel indicating occupancy in the voxel space, the process may subsequently include the operation 802 to restart the process and receive further sensor data. Alternatively, if the process determines that the first image data does include the first pixel indicating occupancy in the voxel space, the process may proceed to operation 810.

At operation 810, the process may include receiving, from a machine learned model, second image data (e.g., second multi-channel image data) comprising a second pixel. In some examples, the second image data may represent a second top-down view of the voxel space. In some examples, the second top-down view may correspond to the first top-down view 204, the second top-down view 206, and/or the multi-resolution top-down view 208. In some examples, the second image data may include segmentation information associated with the second pixel. In some examples, the segmentation information may indicate direction information and/or distance information associated with an object. In some examples, the direction information and/or distance information may correspond to the orientation and distance classification 410. Additionally, or alternatively, the segmentation information may indicate semantic information indicating classifications associated with pixels corresponding to voxels in the voxel space. In some examples, the classifications may correspond to the classifications 406.

At operation 812, the process may include determining whether an amount of information is above a threshold amount. By way of example, the amount of information may be determined to be above the threshold amount based on a number of points associated with the voxel space, voxel, column, or any region being above a threshold number. By way of another example, the operation 812 may include determining whether a number of points associated with a particular classification is above a threshold, or whether a probability of a classification of a point is above a threshold. The operation 812 may be performed on a per voxel basis, a per column basis, on the voxel space as a whole, etc. The process may subsequently include the operation 802 to restart the process, based on the amount of information being determined to be at or below the threshold amount.

At operation 814, the process may include the process may include clustering a portion of the sensor data to determine the object. In some examples, the process may include using one or more clustering techniques, such as a connected components algorithm, to determine semantic and/or segmentation information associated with the object. Additionally, or alternatively, the process may include receiving a mask and/or a bounding box indicating an estimated center and/or an estimate boundary of the object. The operation 814 may also include clustering the portion of the sensor data based on the bounding box and/or the semantic information.

At operation 816, the process may include controlling a vehicle based at least in part on the object. In some examples, the operation 816 may include generating a trajectory to stop the vehicle or to otherwise control the vehicle to safely traverse the environment. In some examples, the operation 816 may include modifying a candidate trajectory based on detected objects, for example, to determine a modified trajectory for the vehicle to follow in the environment.

Example Clauses

A. A system comprising: one or more processors; and one or more non-transitory computer-readable media storing instructions executable by one or more processors, wherein the instructions, when executed, cause the system to perform operations comprising: receiving sensor data from a sensor associated with an autonomous vehicle; associating the sensor data with a voxel space; determining first image data representing a top-down view of the voxel space, wherein a first pixel of the first image data indicates an occupancy of a column of the voxel space; providing, to a machine learned (ML) model, the first image data; receiving, from the ML model, second image data comprising a second pixel corresponding to the first pixel, the second image data including segmentation information associated with the second pixel, the segmentation information comprising direction information and distance information associated with an object; clustering or segmenting, based at least in part on the direction information and the distance information, a portion of the sensor data to determine the object; and controlling the autonomous vehicle based at least in part on the object.

B. The system of paragraph A, wherein the second image data further includes a distractor classification associated with the second pixel, the distractor classification indicating a probability that the second pixel represents at least one of steam, exhaust, or fog.

C. The system of any one of paragraphs A or B, wherein: the direction information is based at least in part on a class associated with the object; and the distance information is based at least in part on a distance from the second pixel to a center of the object.

D. The system of any one of paragraphs A-C, the operations further comprising: receiving a bounding box associated with the second image data, the bounding box indicating a boundary of the object; and wherein the clustering or segmenting the portion of the sensor data to determine the object is further based at least in part on the bounding box.

E. The system of any one of paragraphs A-D, wherein the second image data further includes classification information associated with the second pixel, the classification information indicating: a first probability of the second pixel belonging to one or more object classifications; and a second probability of the second pixel belonging to one or more object group classifications.

F. A method comprising: receiving sensor data from a sensor associated with an autonomous vehicle; associating the sensor data with a three-dimensional voxel space; determining first image data representing a view of the three-dimensional voxel space, wherein a first pixel of the first image data indicates an occupancy of one of a column or a row of three-dimensional first voxel space; providing, to the machine learned (ML) model, the first image data; receiving, from the ML model, segmentation information, the segmentation information indicates direction information and distance information associated with the first pixel; clustering or segmenting, based at least in part on the segmentation information, a portion of the sensor data to determine the object; and controlling the autonomous vehicle based at least in part on the object.

G. The method of paragraph F, further comprising receiving the sensor data as lidar data.

H. The method of any one of paragraphs F or G, wherein: the direction information is based at least in part on a class associated with the object; and the distance information is based at least in part on a distance from the second pixel to a center of the object.

I. The method of any one or paragraphs F-H, further comprising: receiving a bounding box indicating a boundary of the object; and wherein the clustering or segmenting the portion of the sensor data to determine the object is based at least in part on the bounding box.

J. The method of any one or paragraphs F-I, further comprising: receiving classification information associated with the object, the classification information indicating: a first probability of the first pixel belonging to one or more object classifications; and a second probability of the first pixel belonging to one or more object group classifications.

K. The method of any one or paragraphs F-J, wherein the clustering or segmenting the portion of the sensor data to determine the object is based at least in part on a connected components algorithm.

L. The method of any one or paragraphs F-K, wherein the clustering or segmenting the portion of the sensor data to determine the object further comprises associating a unique object identifier with the object.

M. The method of any one or paragraphs F-L, wherein the clustering or segmenting the portion of the sensor data to determine the object is based on a distractor classification indicating a probability that a portion of the sensor data represents at least one of steam, exhaust, or fog.

N. The method of any one or paragraphs F-M, wherein the three-dimensional voxel space comprises a first range, and the method further comprising: determining third image data representing the perspective view of a second voxel space comprising a second range, the first range being less than the second range; inputting the first image data and the second image data into the ML model; and wherein receiving the segmentation information is based at least in part on the first image data and the third image data.

O. One or more non-transitory computer-readable media storing instructions executable by a processor, wherein the instructions, when executed, cause the processor to perform operations comprising: receiving sensor data from a sensor associated with an autonomous vehicle; associating the sensor data with a three-dimensional voxel space; determining first image data representing a top-down view of the three-dimensional voxel space, wherein a first pixel of the first image data indicates an occupancy of one of a column or a row of three-dimensional first voxel space; providing, to the machine learned (ML) model, the first image data; receiving, from the ML model, segmentation information, the segmentation information indicates direction information and distance information associated with the first pixel; clustering or segmenting, based at least in part on the segmentation information, a portion of the sensor data to determine the object; and controlling the autonomous vehicle based at least in part on the object.

P. The one or more non-transitory computer-readable media of paragraph O, the operations further comprising receiving the sensor data as lidar data.

Q. The one or more non-transitory computer-readable media of any one of paragraphs O or P, wherein: the direction information is based at least in part on a class associated with the object; and the distance information is based at least in part on a distance from the second pixel to a center of the object.

R. The one or more non-transitory computer-readable media of any one of paragraphs O-Q, the operations further comprising: receiving a bounding box associated with the second image data, the bounding box indicating a boundary of the object; and wherein the clustering or segmenting the portion of the sensor data to determine the object is based at least in part on the bounding box.

S. The one or more non-transitory computer-readable media of any one of paragraphs O-R, the operations further comprising: receiving classification information associated with the object, the classification information indicating: a first probability of the first pixel belonging to one or more object classifications; and a second probability of the first pixel belonging to one or more object group classifications.

T. The one or more non-transitory computer-readable media of any one of paragraphs O-S, wherein the clustering or segmenting the portion of the sensor data to determine the object is based at least in part on a connected components algorithm.

U. A system comprising: one or more processors; and one or more non-transitory computer-readable media storing instructions executable by one or more processors, wherein the instructions, when executed, cause the system to perform operations comprising: receiving sensor data from a sensor associated with an autonomous vehicle; associating a first portion of the sensor data with a first voxel space comprising a first range; associating a second portion of the sensor data with a second voxel space comprising a second range, the first range being less than the second range, and the second range containing the first range; determining first image data representing a first top-down view of the first voxel space, wherein a first pixel of the first image data indicates an occupancy of a first column of the first voxel space; determining second image data representing a second top-down view of the second voxel space, where a second pixel of the second image data indicates an occupancy of a second column of the second voxel space; inputting the first image data and the second image data into a machine learned (ML) model; receiving, from the ML model, a segmentation mask associated with an object; clustering, based at least in part on the segmentation mask, a third portion of the sensor data to determine the object; and controlling the autonomous vehicle based at least in part on the object.

V. The system of paragraph U, wherein the first image data represents a first area of an environment, and the second image data represents a second area of the environment, the first area being less than the second area, the second area including the first area; and the operations further comprising: inputting the first image data to a first encoder to determine downsampled image data, wherein the first image data is associated with a first resolution and the downsampled image data is associated with a second resolution that is less than the first resolution.

W. The system of paragraph V, the operations further comprising padding the downsampled image data from the first range out to the second range with data to align first rows and columns of the downsampled image data with second rows and columns of the second image data.

X. The system of any of paragraphs U-W, the operations further comprising: receiving, from the ML model, third image data based at least in part on the first image data and the second image data; generating first cropped image data by removing first pixels from the third image data that are within the first range; generating second cropped image data including the first pixels; sending the first cropped image data to a first decoder; sending the second cropped image data to a second decoder; and wherein the segmentation mask is based at least in part on output data received from at least one of the first decoder and the second decoder.

Y. The system of any of paragraphs U-X, wherein: the first image data comprises a number of channels based at least in part on a height of the first voxel space and one or more features, the one or more features comprising: an average x-value of the sensor data associated with the first column; an average y-value of the sensor data associated with the first column; an average z-value of the sensor data associated with the first column; an average sensor intensity of the sensor data associated with the first column; an average probability that the sensor data associated with the first column represents one or more classes of objects; an indication of previous occupancy associated with the first column; or ray casting information of the sensor data associated with the first column.

Z. A method comprising: receiving sensor data from a sensor associated with an autonomous vehicle; associating the sensor data with a first voxel space and a second voxel space, the first voxel space being different from the second voxel space; determining first image data representing a first top-down view of the first voxel space, wherein a first pixel of the first image data indicates an occupancy of a first column of the first voxel space; determining second image data representing a second top-down view of the second voxel space, wherein a second pixel of the second image data indicates an occupancy of a second column of the second voxel space; inputting the first image data and the second image data into a machine learned (ML) model; clustering, based at least in part on output data received from the ML model, a third portion of the sensor data to determine an object; and controlling the autonomous vehicle based at least in part on the object.

AA. The method of paragraph Z, wherein the first voxel space comprises a first range and the second voxel space comprises a second range, the first range being less than the second range.

AB. The method of paragraph AA, wherein the first image data represents a first area of an environment, and the second image data represents a second area of the environment, the first area being less than the second area, the second area including the first area; and the method further comprising: inputting the first image data to an encoder to determine downsampled image data, wherein the first image data is associated with a first resolution and the first downsampled image data is associated with a second resolution that is less than the first resolution.

AC. The method of paragraph AB, further comprising: padding the downsampled image data from the first range out to the second range with data to align first rows and columns of the downsampled image data with second rows and columns of the second image data.

AD. The method of any of paragraphs Z-AC, further comprising: receiving, from the ML model, third image data based at least in part on the first image data and the second image data; generating first cropped image data by removing first pixels from the third image data that are within a region associated with the center of the third image data; generating second cropped image data including the first pixels; sending the first cropped image data to a first decoder; and sending the second cropped image data to a second decoder.

AE. The method of any of paragraphs Z-AD, further comprising: receiving, from the ML model, the output data, wherein the output data represents a segmentation mask associated with the object; and wherein the clustering the third portion of the sensor data to determine the object is based at least in part on the segmentation mask.

AF. The method of any of paragraphs Z-AE, wherein the output data comprises direction information and orientation information associated with pixels of the first image data or second image data.

AG. The method of any of paragraphs Z-AF, wherein: the first image data comprises one or more features comprising: an average x-value of the sensor data associated with the first column; an average y-value of the sensor data associated with the first column; an average z-value of the sensor data associated with the first column; an average sensor intensity of the sensor data associated with the first column; an average probability that the sensor data associated with the first column represents one or more classes of objects; an indication of previous occupancy associated with the first column; or ray casting information of the sensor data associated with the first column.

AH. The method of paragraph AG, wherein the first image data comprises one or more channels and the method further comprises: determining, based at least in part on the sensor data, semantic information; associating a first portion of the semantic information with the first voxel space; associating a second portion of the semantic information with the second voxel space; and determining a number of channels associated with the first image data based at least in part on the first voxel space.

AI. One or more non-transitory computer-readable media storing instructions executable by a processor, wherein the instructions, when executed, cause the processor to perform operations comprising: receiving sensor data from a sensor associated with an autonomous vehicle; associating the sensor data with a first voxel space and a second voxel space, the first voxel space being different from the second voxel space; determining first image data representing a first top-down view of the first voxel space, wherein a first pixel of the first image data indicates an occupancy of a first column of the first voxel space; determining second image data representing a second top-down view of the second voxel space, wherein a second pixel of the second image data indicates an occupancy of a second column of the second voxel space; inputting the first image data and the second image data into a machine learned (ML) model; clustering, based at least in part on output data received from the ML model, a third portion of the sensor data to determine an object; and controlling the autonomous vehicle based at least in part on the object.

AJ. The one or more non-transitory computer-readable media of paragraph AI, the operations further comprising: inputting the first image data to an encoder to determine downsampled image data, wherein the first image data is associated with a first resolution and the downsampled image data is associated with a second resolution that is less than the first resolution; and padding the first downsampled image data from the first range out to the second range with data to align first rows and columns of the downsampled image data with second rows and columns of the second image data.

AK. The one or more non-transitory computer-readable media of paragraph AJ, the operations further comprising: receiving, from the ML model, the output data, wherein the output data represents a segmentation mask associated with the object; and wherein the clustering the third portion of the sensor data to determine the object is based at least in part on the segmentation mask.

AL. The one or more non-transitory computer-readable media of any of paragraphs AI-AK, the operations further comprising: receiving, from the ML model, third image data based at least in part on the first image data and the second image data; generating a first cropped image by removing first pixels associated with a center of the third image data; generating a second cropped image including the first pixels; sending the first cropped image to a first decoder; and sending the second cropped image to a second decoder.

AM. The one or more non-transitory computer-readable media of any of paragraphs AI-AL, wherein the output data comprises a first layer associated with direction information and a second layer associated with orientation information.

AN. The one or more non-transitory computer-readable media of any of paragraphs AI-AM, wherein: the first image data comprises one or more features comprising: an average x-value of the sensor data associated with the first column; an average y-value of the sensor data associated with the first column; an average z-value of the sensor data associated with the first column; an average sensor intensity of the sensor data associated with the first column; an average probability that the sensor data associated with the first column represents one or more classes of objects; an indication of previous occupancy associated with the first column; or ray casting information of the sensor data associated with the first column.

While the example clauses described above are described with respect to one particular implementation, it should be understood that, in the context of this document, the content of the example clauses may also be implemented via a method, device, system, computer-readable medium, and/or another implementation. Additionally, any of examples A-AN may be implemented alone or in combination with any other one or more of the examples A-AN.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described.

The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions executable by one or more processors, wherein the instructions, when executed, cause the system to perform operations comprising:
receiving sensor data from a sensor associated with an autonomous vehicle;
associating the sensor data with a voxel space;
determining first image data representing a top-down view of the voxel space, wherein a first pixel of the first image data indicates an occupancy of a column of the voxel space;
providing, to a machine learned (ML) model, the first image data;
receiving, from the ML model, second image data comprising a second pixel corresponding to the first pixel, the second image data including segmentation information associated with the second pixel, the segmentation information comprising direction information and distance information associated with an object;
clustering or segmenting, based at least in part on the direction information and the distance information, a portion of the sensor data to determine the object; and
controlling the autonomous vehicle based at least in part on the object.

2. The system of claim 1, wherein the second image data further includes a distractor classification associated with the second pixel, the distractor classification indicating a probability that the second pixel represents at least one of steam, exhaust, or fog.

3. The system of claim 1, wherein:
the direction information is based at least in part on a class associated with the object; and
the distance information is based at least in part on a distance from the second pixel to a center of the object.

4. The system of claim 1, the operations further comprising:
receiving a bounding box associated with the second image data, the bounding box indicating a boundary of the object; and
wherein the clustering or segmenting the portion of the sensor data to determine the object is further based at least in part on the bounding box.

5. The system of claim 1, wherein the second image data further includes classification information associated with the second pixel, the classification information indicating:
a first probability of the second pixel belonging to one or more object classifications; and
a second probability of the second pixel belonging to one or more object group classifications.

6. A method comprising:
receiving sensor data from a sensor associated with an autonomous vehicle;
associating the sensor data with a three-dimensional voxel space;
determining first image data representing a view of the three-dimensional voxel space, wherein a first pixel of the first image data indicates an occupancy of one of a column or a row of three-dimensional first voxel space;
providing, to a machine learned (ML) model, the first image data;
receiving, from the ML model, segmentation information, the segmentation information indicates direction information and distance information associated with the first pixel;
clustering or segmenting, based at least in part on the segmentation information, a portion of the sensor data to determine an object; and
controlling the autonomous vehicle based at least in part on the object.

7. The method of claim 6, further comprising receiving the sensor data as lidar data.

8. The method of claim 6, wherein:
the direction information is based at least in part on a class associated with the object; and
the distance information is based at least in part on a distance from the first pixel to a center of the object.

9. The method of claim 6, further comprising:
receiving a bounding box indicating a boundary of the object; and
wherein the clustering or segmenting the portion of the sensor data to determine the object is based at least in part on the bounding box.

10. The method of claim 6, further comprising:
receiving classification information associated with the object, the classification information indicating:
a first probability of the first pixel belonging to one or more object classifications; and
a second probability of the first pixel belonging to one or more object group classifications.

11. The method of claim 6, wherein the clustering or segmenting the portion of the sensor data to determine the object is based at least in part on a connected components algorithm.

12. The method of claim 6, wherein the clustering or segmenting the portion of the sensor data to determine the object further comprises associating a unique object identifier with the object.

13. The method of claim 6, wherein the clustering or segmenting the portion of the sensor data to determine the object is based on a distractor classification indicating a probability that a portion of the sensor data represents at least one of steam, exhaust, or fog.

14. The method of claim 6, wherein the three-dimensional voxel space comprises a first range, and the method further comprising:
determining second image data representing the view of a second voxel space comprising a second range, the first range being less than the second range;
inputting the first image data and the second image data into the ML model; and
wherein receiving the segmentation information is based at least in part on the first image data and the second image data.

15. One or more non-transitory computer-readable media storing instructions executable by a processor, wherein the instructions, when executed, cause the processor to perform operations comprising:
receiving sensor data from a sensor associated with an autonomous vehicle;
associating the sensor data with a three-dimensional voxel space;

determining first image data representing a ialof the three-dimensional voxel space, wherein a first pixel of the first image data indicates an occupancy of one of a column or a row of three-dimensional first voxel space;

providing, to a machine learned (ML) model, the first image data;

receiving, from the ML model, segmentation information, the segmentation information indicates direction information and distance information associated with the first pixel;

clustering or segmenting, based at least in part on the segmentation information, a portion of the sensor data to determine an object; and controlling the autonomous vehicle based at least in part on the object.

16. The one or more non-transitory computer-readable media of claim 15, the operations further comprising receiving the sensor data as lidar data.

17. The one or more non-transitory computer-readable media of claim 15, wherein:

the direction information is based at least in part on a class associated with the object; and the distance information is based at least in part on a distance from the first pixel to a center of the object.

18. The one or more non-transitory computer-readable media of claim 15, the operations further comprising:

receiving a bounding box associated with the segmentation information, the bounding box indicating a boundary of the object; and wherein the clustering or segmenting the portion of the sensor data to determine the object is based at least in part on the bounding box.

19. The one or more non-transitory computer-readable media of claim 15, the operations further comprising:

receiving classification information associated with the object, the classification information indicating:

a first probability of the first pixel belonging to one or more object classifications; and a second probability of the first pixel belonging to one or more object group classifications.

20. The one or more non-transitory computer-readable media of claim 15, wherein the clustering or segmenting the portion of the sensor data to determine the object is based at least in part on a connected components algorithm.

* * * * *

UNITED STATES PATENT AND TRADEMARK OFFICE
CERTIFICATE OF CORRECTION

| | |
|---|---|
| PATENT NO. | : 11,270,437 B1 |
| APPLICATION NO. | : 17/127295 |
| DATED | : March 8, 2022 |
| INVENTOR(S) | : Stanley Lilian Volta et al. |

It is certified that error appears in the above-identified patent and that said Letters Patent is hereby corrected as shown below:

In the Claims

Column 37, Line 1, Claim 15, change "ialof" to -- top down view of --

Signed and Sealed this
Seventeenth Day of May, 2022

*Katherine Kelly Vidal*

Katherine Kelly Vidal
*Director of the United States Patent and Trademark Office*